US010290065B2

(12) United States Patent
Martin et al.

(10) Patent No.: US 10,290,065 B2
(45) Date of Patent: May 14, 2019

(54) LIGHTING INFRASTRUCTURE AND REVENUE MODEL

(71) Applicant: Sensity Systems Inc., Sunnyvale, CA (US)

(72) Inventors: Hugh Martin, Sunnyvale, CA (US); Rusty Cumpston, Sunnyvale, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 139 days.

(21) Appl. No.: 15/642,944

(22) Filed: Jul. 6, 2017

(65) Prior Publication Data

US 2017/0316520 A1 Nov. 2, 2017

Related U.S. Application Data

(60) Continuation of application No. 15/387,730, filed on Dec. 22, 2016, now Pat. No. 9,965,813, which is a
(Continued)

(51) Int. Cl.
*G06Q 30/00* (2012.01)
*G06Q 50/06* (2012.01)
(Continued)

(52) U.S. Cl.
CPC ............ *G06Q 50/06* (2013.01); *G06F 8/61* (2013.01); *G06F 8/65* (2013.01); *G06F 9/445* (2013.01);
(Continued)

(58) Field of Classification Search
None
See application file for complete search history.

(56) References Cited

U.S. PATENT DOCUMENTS

| 4,384,288 A | 5/1983 | Walton |
| 5,161,107 A | 11/1992 | Mayeaux et al. |

(Continued)

FOREIGN PATENT DOCUMENTS

| CN | 1918593 | 2/2007 |
| CN | 101370334 | 2/2009 |

(Continued)

OTHER PUBLICATIONS

"International Search Report", International Application No. PCT/US2013/045407, dated Sep. 23, 2013, 22pgs.
(Continued)

*Primary Examiner* — Mila Airapetian

(57) ABSTRACT

A method for a computing device calculates savings information associated with a lighting infrastructure application framework. The method comprises receiving, at the computing device, data from a lighting infrastructure, the data including at least one of sensor data and controller information related to at least one of a sensor and a controller; calculating savings information associated with management and a use of the plurality of lighting node platform devices. One embodiment, the data includes real time energy usage data from a plurality of lighting node platform devices within the lighting infrastructure application framework. The method automatically calculates energy savings information and carbon credit information based on the calculated energy savings information. The energy and carbon credit information are associated with the management and the use of the plurality of lighting node platform devices, and transmits a request for carbon credits based on the calculated carbon credit information.

20 Claims, 20 Drawing Sheets

Related U.S. Application Data continuation of application No. 14/250,794, filed on Apr. 11, 2014, now abandoned, which is a division of application No. 13/915,856, filed on Jun. 12, 2013, now Pat. No. 8,732,031.

(60) Provisional application No. 61/658,874, filed on Jun. 12, 2012, provisional application No. 61/812,219, filed on Apr. 15, 2013.

(51) Int. Cl.

| | | |
|---|---|---|
| *G06Q 40/00* | (2012.01) | |
| *G06Q 10/00* | (2012.01) | |
| *G06F 8/61* | (2018.01) | |
| *G06F 8/65* | (2018.01) | |
| *G06Q 20/14* | (2012.01) | |
| *G06Q 30/02* | (2012.01) | |
| *G06Q 30/08* | (2012.01) | |
| *H05B 37/02* | (2006.01) | |
| *G06Q 40/02* | (2012.01) | |
| *H05B 33/08* | (2006.01) | |
| *G06F 9/445* | (2018.01) | |
| *G06N 5/02* | (2006.01) | |
| *G06Q 10/06* | (2012.01) | |
| *G06Q 30/04* | (2012.01) | |
| *H04L 29/08* | (2006.01) | |
| *G06N 7/00* | (2006.01) | |
| *G06Q 40/04* | (2012.01) | |

(52) U.S. Cl.
CPC ............ *G06N 5/022* (2013.01); *G06N 7/005* (2013.01); *G06Q 10/067* (2013.01); *G06Q 10/20* (2013.01); *G06Q 20/14* (2013.01); *G06Q 30/018* (2013.01); *G06Q 30/0202* (2013.01); *G06Q 30/0206* (2013.01); *G06Q 30/0283* (2013.01); *G06Q 30/04* (2013.01); *G06Q 30/08* (2013.01); *G06Q 40/00* (2013.01); *G06Q 40/02* (2013.01); *G06Q 40/04* (2013.01); *G06Q 40/12* (2013.12); *H04L 67/34* (2013.01); *H05B 33/0845* (2013.01); *H05B 33/0854* (2013.01); *H05B 37/0218* (2013.01); *H05B 37/0245* (2013.01); *H05B 37/0272* (2013.01); *Y02B 20/40* (2013.01); *Y02P 90/84* (2015.11); *Y02P 90/90* (2015.11)

(56) References Cited

U.S. PATENT DOCUMENTS

| | | |
|---|---|---|
| 5,793,491 A | 8/1998 | Wangler et al. |
| 6,118,230 A | 9/2000 | Fleischmann |
| 6,364,253 B1 | 4/2002 | Cavanagh |
| 6,608,453 B2 | 8/2003 | Morgan et al. |
| 6,961,313 B1 | 11/2005 | Gaspar |
| 6,999,882 B2 | 2/2006 | Frie et al. |
| 7,304,727 B2 | 12/2007 | Chien et al. |
| 7,333,903 B2 | 2/2008 | Walters et al. |
| 7,613,590 B2 | 11/2009 | Brown |
| 7,817,063 B2 | 10/2010 | Hawkins et al. |
| 7,825,602 B2 | 11/2010 | Hu et al. |
| 7,925,384 B2 | 4/2011 | Huizenga et al. |
| 7,983,685 B2 | 7/2011 | Silverstrim et al. |
| 7,986,339 B2 | 7/2011 | Higgins |
| 8,027,809 B2 | 9/2011 | Brown |
| 8,049,592 B2 | 11/2011 | Wang et al. |
| 8,073,554 B2 | 12/2011 | Vezza et al. |
| 8,078,431 B2 | 12/2011 | Brown |
| 8,095,340 B2 | 1/2012 | Brown |
| 8,111,018 B2 | 2/2012 | You |
| 8,147,267 B2 | 4/2012 | Oster |
| 8,244,260 B2 | 8/2012 | Silverstrim et al. |
| 8,306,051 B2 | 11/2012 | Stocker |
| 8,441,397 B2 | 5/2013 | Binzer et al. |
| 8,493,209 B2 | 7/2013 | Mohan et al. |
| 8,587,225 B2 | 11/2013 | Ashar et al. |
| 8,732,031 B2 | 5/2014 | Martin et al. |
| 2002/0099643 A1 | 7/2002 | Abeshouse et al. |
| 2003/0102979 A1 | 6/2003 | Jednacz et al. |
| 2003/0222587 A1 | 12/2003 | Dowling et al. |
| 2004/0124338 A1 | 7/2004 | Cloutier et al. |
| 2005/0038665 A1 | 2/2005 | Hasebe et al. |
| 2007/0169075 A1 | 7/2007 | Lill et al. |
| 2007/0234036 A1 | 10/2007 | Tan et al. |
| 2007/0294393 A1 | 12/2007 | Smith et al. |
| 2008/0215391 A1 | 9/2008 | Dowling et al. |
| 2009/0026966 A1 | 1/2009 | Budde et al. |
| 2009/0195349 A1* | 8/2009 | Frader-Thompson ..................... G01D 4/002 340/3.1 |
| 2009/0243517 A1* | 10/2009 | Verfuerth ........... H05B 37/0272 315/315 |
| 2009/0278479 A1 | 11/2009 | Platner et al. |
| 2009/0299527 A1 | 12/2009 | Huizenga et al. |
| 2010/0001652 A1 | 1/2010 | Damsleth |
| 2010/0228601 A1 | 9/2010 | Vaswani et al. |
| 2010/0332373 A1 | 12/2010 | Crabtree et al. |
| 2011/0002324 A1 | 1/2011 | Falck et al. |
| 2011/0066297 A1 | 3/2011 | Saberi et al. |
| 2011/0158410 A1 | 6/2011 | Falk et al. |
| 2012/0002406 A1 | 1/2012 | Leadford et al. |
| 2012/0038281 A1 | 2/2012 | Verfuerth |
| 2012/0040606 A1 | 2/2012 | Verfuerth |
| 2012/0068608 A1 | 3/2012 | Covaro et al. |
| 2012/0086363 A1* | 4/2012 | Golding ................ H05B 37/00 315/312 |
| 2012/0086561 A1 | 4/2012 | Ilyes et al. |
| 2012/0130544 A1 | 5/2012 | Mohan et al. |
| 2012/0146518 A1 | 6/2012 | Keating et al. |
| 2012/0262093 A1 | 10/2012 | Recker et al. |
| 2012/0310984 A1 | 12/2012 | Branson et al. |
| 2013/0013091 A1 | 1/2013 | Cavalcanti et al. |
| 2013/0088168 A1 | 4/2013 | Mohan et al. |
| 2013/0134886 A1 | 5/2013 | Golding et al. |
| 2013/0211613 A1 | 8/2013 | Praske et al. |
| 2013/0221203 A1 | 8/2013 | Barrilleaux |
| 2013/0231793 A1* | 9/2013 | Elliott .................... G05B 15/02 700/292 |
| 2013/0265563 A1 | 10/2013 | Vogt et al. |
| 2013/0297212 A1 | 11/2013 | Ramer et al. |
| 2014/0222510 A1 | 8/2014 | Martin et al. |

FOREIGN PATENT DOCUMENTS

| | | |
|---|---|---|
| CN | 101494941 | 7/2009 |
| CN | 101711077 | 5/2010 |
| CN | 101776907 | 7/2010 |
| CN | 201601867 | 10/2010 |
| CN | 201869412 | 6/2011 |
| CN | 102388397 | 3/2012 |
| CN | 102437868 | 5/2012 |
| CN | 104662999 | 5/2015 |
| EP | 2709428 | 3/2014 |
| JP | 2003-068475 | 3/2003 |
| JP | 2005-321934 | 11/2005 |
| JP | 2011-076129 | 4/2011 |
| JP | 2015-529869 | 10/2015 |
| KR | 10-2007-0044243 | 4/2007 |
| KR | 10-2007-60535 | 9/2007 |
| KR | 10-2007-84836 | 12/2007 |
| KR | 10-2010-0136186 | 12/2010 |
| KR | 10-2011-0017037 | 2/2011 |
| KR | 10-2011-0055807 | 5/2011 |
| WO | 2011/053969 | 5/2011 |
| WO | 2011/121470 | 10/2011 |
| WO | 2011/132013 | 10/2011 |

(56) References Cited

FOREIGN PATENT DOCUMENTS

| WO | 2012/042432 | 4/2012 |
| WO | 2012/140152 | 10/2012 |
| WO | 2013/165777 | 11/2013 |

OTHER PUBLICATIONS

Munoz, et al., "Position Location Techniques and Applications", Academic Press, (2009) 297 pgs.

Xu, et al., "Distance Measurement Model Based on RSSI in WSN", Wireless Sensor Network, vol. 2, (2010), pp. 606-611.

Tubinis, "Creation of Automated Accounting System and Consumption Management Electricity in Italy", Electro magazine No. 4/2004, pp. 48-52, English language machine translation and Russian language version. (Publication relied upon as prior art in corresponding Eurasian Patent App. No. 201500002, filed Jun. 12, 2013).

English language machine translation of previously cited patent publication CN-102437868, published May 2, 2012, to Xuecheng, et al. submitted herewith. (Patent reference relied upon as prior art in corresponding Chinese Patent App. No. 201380041397.2, filed Jun. 12, 2013).

\* cited by examiner

LIGHTING INFRASTRUCTURE AND REVENUE MODEL

RELATED APPLICATIONS

The present application is a continuation of U.S. patent application Ser. No. 15/387,730, filed Dec. 22, 2016 entitled "LIGHTING INFRASTRUCTURE AND REVENUE MODEL" which is a Continuation of U.S. patent application Ser. No. 14/250,794, filed Apr. 11, 2014 entitled "LIGHTING INFRASTRUCTURE AND REVENUE MODEL" which is a divisional application of and claims benefit of the copending parent application U.S. Non-Provisional patent application Ser. No. 13/915,856, entitled "Lighting Infrastructure and Revenue Model" and filed on Jun. 12, 2013 which claims the benefit of priority to U.S. Provisional Application No. 61/658,874, entitled "Street Lamp Revenue Model" and filed Jun. 12, 2012, and U.S. Provisional Application No. 61/812,219, entitled "Lighting Infrastructure and Revenue Model" filed Apr. 15, 2013, the entire contents of all of which are hereby incorporated by reference.

BACKGROUND

Industrialized countries throughout the world have extensive networks of indoor and outdoor lighting. Streets, highways, parking lots, factories, office buildings, and all types of facilities often have extensive indoor and outdoor lighting. Substantially all of this lighting, until recently, uses incandescent technology. Incandescent lighting, however, is inefficient in conversion of electrical power to light output. A substantial fraction of the electrical power used for incandescent lighting is dissipated as heat. This not only wastes energy but also often causes failures in the light bulbs themselves, as well as in the lighting apparatus.

As a result of these disadvantages, and the operating and maintenance cost efficiencies of light emitting diodes or other solid-state lighting technologies, many owners of large numbers of incandescent light fixtures are converting them to use solid-state lighting. Solid-state lighting not only provides for longer life bulbs, thereby reducing labor costs for replacement, but the resulting fixtures also operate at low temperatures for longer periods, further reducing the need to maintain the fixtures. Current lighting services and devices do not provide various municipalities and private owners with lighting infrastructures that enable operating their facilities with reduced maintenance costs and reduced energy costs, as well as improvements that may utilize dynamic data collection to improve lighting systems.

SUMMARY

The various embodiments include systems and methods for providing a lighting infrastructure application framework or network that communicates with and otherwise manages street lighting and/or other lighting infrastructures having integrated application platform, network, and sensor capabilities.

In an embodiment, a computing device may perform a method to implement a revenue model related to a lighting infrastructure, comprising receiving, at the computing device, a request from a first device to access data from a lighting infrastructure application framework, wherein the data from the lighting infrastructure application framework includes data from at least one lighting node platform device of a plurality of lighting node platform devices, transmitting a response to the request from the first device based at least in part on the requested data from the lighting infrastructure application framework, and calculating at least one of a fee and a revenue related to the transmitted response. In another embodiment, the method may further include registering devices based on received registration information, wherein the registration information is transmitted by one of a device associated with an application provider and the first device. In an embodiment, the registration information may include at least one of authentication credentials, access-control credentials, licensing information, advertisement authorization information, payment information, and a selection of at least one of a plurality of data types. In an embodiment, the plurality of data types may include occupancy sensor data, energy usage sensor data, light sensor data (e.g., daylight sensor data, ambient light sensor data, light level sensor data, etc.), environmental sensor data, (e.g., temperature sensor data, wind sensor data, humidity sensor data, weather sensor data, pollution sensor data, particulate sensor data, barometric pressure sensor data, etc.), security sensor data (e.g., motion detection sensor data, glass break sensor data, video/audio data, etc.), audio/microphone sensor data, visual data (e.g., video cameras, etc.), gas detection sensor data (e.g., carbon dioxide sensor data, carbon monoxide sensor data, methane sensor data, natural gas sensor data, oxygen sensor data, propane sensor data, butane sensor data, ammonia sensor data, hydrogen sulfide sensor data, etc.), intrusion detector data, motion sensor data, vibration sensor data, people detection sensor data, vehicle detection sensor data, safety sensor data (e.g., radiation sensor data, other toxic gases sensor data, etc.), biohazard sensor data, scanning sensor data (e.g., active, passive, and hybrid RFID), location sensor data (e.g., GPS), biometric sensor data (e.g., Human Presence), mechanical sensor data (e.g., Force/Strain, accelerometers, etc.), signal detectors (e.g., radio frequency detector, WiFi detector, Bluetooth detector, etc.), industry specific sensor data (e.g., traffic, parking, medical, law enforcement, earthquake sensor data, gunshot sensor data, etc.), correlated data, and aggregated data. In an embodiment, the method may further include verifying an authorization for the first device to access the requested data from the lighting infrastructure application framework by determining whether the first device is authorized based on the received registration information, and transmitting a request for registration information from the first device when the first device is determined to not be authorized, and wherein transmitting a response to the request from the first device based at least in part on the requested data from the lighting infrastructure application framework comprises transmitting the response to the request from the first device when the first device is determined to be authorized. In an embodiment, the lighting infrastructure application framework may include at least one service platform computing device, at least one gateway platform device, and the plurality of lighting node platform devices, and the at least one gateway platform device may be configured to exchange communications with the at least one service platform computing device, and the plurality of lighting node platform devices may be configured to exchange communications with the at least one gateway platform device such that data associated with the plurality of lighting node platform devices is transmitted to the at least one service platform computing device via the at least one gateway platform device. In an embodiment, calculating at least one of a fee and a revenue related to the transmitted response may include determining usage characteristics for the first device based on the request, and calculating the fee based on the determined usage characteristics. In an embodiment, the usage characteristics may include at least one of a type of data, a frequency of data access, an amount of data, a data source location, a data demand, and a request time. In an embodiment, calculating at least one of a fee and a revenue related to the transmitted response may include determining lighting node platform device usage by the lighting infrastructure application framework related to the transmitted response, and calculating the revenue for a lighting infrastructure owner related to the determined lighting node platform device usage, wherein the lighting infrastructure owner is associated with the lighting infrastructure that includes the lighting node platform device. In an embodiment, the at least one lighting node platform device may include a power supply for receiving electrical power, a light socket coupled to the power supply, a node application controller comprising a processor coupled to the power supply, a network interface coupled to the processor, wherein the network interface is communicatively coupled to a service platform computer via a gateway or direct connection, and a sensor coupled to the processor for detecting a condition at the at least one lighting node platform device, and in response providing information about the condition to the processor. In an embodiment, the power supply for electrical power includes a power input terminal for receiving AC electrical power, and wherein first lighting node platform device may further include an AC/DC converter coupled to the power input terminal, an LED driver coupled to the AC/DC converter, and a power interface coupled to the LED driver to provide power from the AC/DC converter to a first sensor. In an embodiment, the lighting infrastructure application framework may include a plurality of sensors such that each of the plurality of lighting node platform devices comprises at least one sensor of the plurality of sensors, and each sensor of the plurality of sensors provides sensor data to a service platform computer. In an embodiment, the plurality of sensors comprises an energy use sensor, a light sensor, a motion detector, an occupancy sensor, an energy usage sensor, a light sensor, an environmental sensor, a security sensor, an audio sensor, a camera, a gas detection sensor, an intrusion detector, a vibration sensor, a people detection sensor, a glass break sensor, a vehicle detection sensor, a safety sensor, a biohazard sensor, a scanning sensor, a motion sensor, a location sensor, a biometric sensor, a mechanical sensor, a signal detector, and an industry specific sensor. In an embodiment, the method may include receiving, at the computing device, the request transmitted by an application executing on the first device to access data from a lighting infrastructure application framework, wherein the first device is at least one of a third-party device and a service platform computer.

In another embodiment, a computing device may be configured to perform a method to calculate fees and revenues related to a lighting infrastructure application framework, the method including receiving, at the computing device, data that includes at least one of sensor data and/or controller information related to at least one of a sensor and/or a controller, wherein the sensor and the controller are within a local area network coupled to the computing device and are associated with at least one lighting node platform device, calculating information describing the fees and the revenues associated with the received data, wherein the revenue is for a lighting infrastructure owner associated with the computing device, and transmitting the calculated information to another device associated with the lighting infrastructure application framework.

In another embodiment, a computing device may be configured to perform a method to calculate savings information associated with a lighting infrastructure application framework, the method including receiving, at the computing device, real time energy usage data from a plurality of lighting node platform devices within the lighting infrastructure application framework, calculating energy savings information associated with management and a use of the plurality of lighting node platform devices, automatically calculating carbon credit information based on the calculated energy savings information associated with the management and the use of the plurality of lighting node platform devices, and transmitting a request for carbon credits based on the calculated carbon credit information. In an embodiment, the method may also include trading carbon credits received in response to the request for additional revenue for at least one of the lighting infrastructure application framework operator and a lighting infrastructure owner associated with the plurality of lighting node platform devices.

In another embodiment, a computing device may be configured to perform a method to distribute software related to a lighting infrastructure application framework, the method including receiving, at the computing device, the software, wherein the software is to be executed by at least one of a plurality of lighting node platform devices within the lighting infrastructure application framework, wherein the software is at least one of a script, an application, an app, and a routine, storing the received software in relation to a provider of the software, wherein the provider is one of an application provider and a lighting infrastructure owner, and transmitting the software to destination devices in response to receiving a request. In an embodiment, the method may also include receiving, at the computing device, an update to the software, wherein the update is at least one of a binary update, a firmware update, and configuration data, and transmitting the update in response to receiving the update. In an embodiment, the request may be from a one of a third-party device that is not affiliated with the lighting infrastructure owner, a gateway platform device, and one of the plurality of lighting node platform devices. In an embodiment, the destination devices may be at least one of the plurality of lighting node platform devices. In an embodiment, the method may also include calculating at least one of a fee and a revenue in response to transmitting the software, and transmitting a message indicating the at least one of the fees and the revenue, wherein the message is transmitted to one of the application provider and the lighting infrastructure owner. In another embodiment, the at least one of the fee and the revenue is based on data transmitted in association with the at least one of the plurality of lighting node platform devices executing the software.

In another embodiment, a computing device may be configured to perform a method to process data received in relation to a lighting infrastructure application framework, the method including receiving, at the computing device, data reported by a plurality of lighting node platform devices within the lighting infrastructure application framework, processing the received data by at least one of analyzing or aggregating the received data, detecting an occurrence of at least one of a plurality of predefined events based on the processing of the received data, identifying a trend within the received data based on the processing of the received data, and predicting a future occurrence of at least one of the plurality of predefined events based on the processing of the data. In an embodiment, the method may also include transmitting messages reporting the analysis of the received data. In an embodiment, the method may also include transmitting commands based on at least one of the received data and the analysis of the received data, wherein the commands include at least one of software, scripts, and configuration data. In an embodiment, the commands include operating instructions for sensors associated with the plurality of lighting node platform devices.

In another embodiment, a computing device may be configured to perform a method to provide a data market associated with a lighting infrastructure applications framework, and the method may include receiving, at the computing device, data related to a lighting infrastructure that includes at least one lighting node platform device, calculating a value and bidding conditions of the received data based on value factors, wherein the value factors include at least a data type and collection area, receiving a bid message for the received data, determining whether bidding conditions have been met based on the calculated bidding conditions, and transmitting the data to a recipient device associated with the received bid message when the bidding conditions are determined to have been met.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
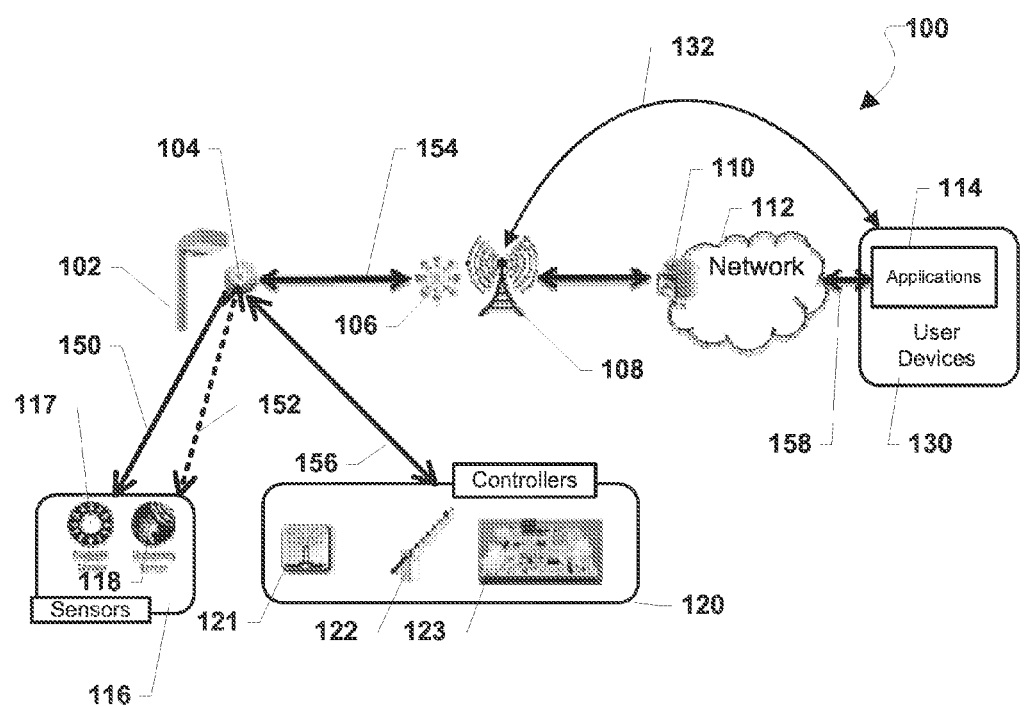
FIG. 1A is a component block diagram illustrating an embodiment architecture of a networked lighting system (or Lighting Infrastructure Application Framework).

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "computing system" or "computing device" are used herein to refer to any one or all of servers, mobile computing devices, desktop computers, server blades, laptop computers, personal computers, and similar electronic devices equipped with at least a processor and a network transceiver configured to establish a wide area network (WAN) or local area network (LAN) connection (e.g., an LTE, 3G or 4G wireless wide area network transceiver, a wired connection to the Internet, WiFi, Bluetooth, etc.).

The various embodiments provide methods for systems and methods for utilizing sensors in combination with lighting devices to enable functionality beyond lighting spaces. In various framework embodiments described herein, a lighting infrastructure may be utilized as a platform for business and consumer applications. The key components of the framework may include hardware, software, and network resources in a secure distributed framework that enables data collection, analysis, action invocation and communication with applications and/or various users.

Systems and methods are disclosed for providing access to sensor information integrated within a networked application framework for deployment in street or other lighting systems. Such systems and methods may include various models for providing access to sensor information from such a network as part of various revenue models for monetizing networked devices integrated with a lighting system. The architecture of such a system allows deployment of a networked system within the lighting infrastructure already in place, or at the time of its initial installation. While the system may be deployed in outdoor street lighting, it also may be deployed indoors, for example, in a factory or office building. Also in certain embodiments, when the system is deployed outdoors, it may be installed at a time when street lamp bulbs are changed from incandescent lighting to more efficient lighting, such as lighting using light emitting diodes (LEDs). The cost of replacing such incandescent bulbs is high, primarily due to the cost of labor and the necessity to use special equipment to reach each bulb in each street lamp. By installing the network described here at that time, the incremental cost vis-a-vis merely replacing the existing incandescent bulb with an LED bulb is minimal.

Because the system enables numerous different uses, the deployed sensor system is referred to as a Lighting Infrastructure Application Framework (LIAF), also known as a Light Sensory Network (LSN) when the system includes sensors. The system uses lighting infrastructure as a platform for government, municipality, business and consumer applications. The main components of the framework are the hardware, software and network resources that enable data collection, analysis, action invocation and communication with applications and users. Although the system is described here in the context of street lighting, it will be evident from the following description that the system has applicability to other environments, for example, in an indoor office or factory environment.

As a network of individual devices accessible through such a LIAF grows larger and larger, the costs and complexity of managing the system and the data available through such a system grows. Therefore, systems and methods for managing access to such a system may be desirable to provide improved resource usage and access to information. Further, system management may be required to manage and improve the number of sites available for placement of sensors and other devices within a LIAF. For example, a user may provide a fee to applications that operate using information from a LIAF. The applications may provide a portion of that revenue in exchange for access to information from the LIAF. Different levels of fees may be associated with types and quantities of information. An operator of the LIAF may in turn use a portion of the income from applications to pay a property owner for use of information from devices operating on property and within a lighting system on the property owner's property. Such properties may be referred to as "lighting infrastructures," and such property owners may also be referred to as "lighting infrastructure owners."

In an embodiment, the system provides for a network of lighting systems using existing street lights. Each street light becomes (or is equipped with) a lighting node platform in the network, and each lighting node platform includes a power supply for receiving electrical power, a light socket or light source coupled to the power supply, a processor coupled to the power supply, a network interface coupled between the processor and the network of lighting node platforms, and one or more sensors coupled to the processor for detecting a condition at the lighting node platform. In combination this allows each lighting node platform to convey information to other lighting node platforms and to central locations about the conditions at the lighting node platforms. Each light may be associated with a different lighting infrastructure owner and with different sets of devices, and fees provided to the lighting infrastructure owner may vary based on the location of the devices within the lighting system and on the type, quantity, and quality of information from each lighting node platform.

A particular benefit of such a system is that networking hardware and sensors that may make use of the networking hardware may be powered from the same source that powers lights in the lighting system. Input power previously used for incandescent bulbs may be used at the termination point with a driver that powers both an LED light source and one or more sensors or electronic devices. A Wi-Fi access point, various sensors (e.g., a security camera, a weather sensor, a motion detector, a range finder, etc.), and any combination of these in conjunction with other such devices may thus be powered at the light. A modular driver that is adapted to power such sensors and an LED light source may thus be included in various embodiments to enable flexibility in a lighting system to power any number of devices that may be used by the network.

In an embodiment, a system may use a gateway coupled to the network interface of each lighting node platform for providing information from the sensors at the lighting node platforms to a service platform where data is distributed to third-party applications and in some cases application software is executed. This software performs desired operations related to the conditions detected by the sensors at the lighting node platforms. In addition the gateway may receive information from the service platform and provide that information to the network interface at the lighting node platform. That information may be used to facilitate maintenance of the light, control of the light, or numerous other applications, many of which have nothing to do with lighting, and some of which are described herein. The sensors at the lighting node platforms may be used with controllers (e.g., hardware and/or software controllers) to control the light source, as well as to provide control signals to apparatus coupled to the lighting node platform (e.g., lock or unlock a parking area, turn-on an exhaust fan in an indoor parking garage, etc.). Multiple gateways may be used to couple multiple regions of the lighting system together for purposes of a single application. Typically each lighting node platform will include an AC/DC converter to convert the street lamp AC power to DC for use by the processor, sensor, etc. The gateways may communicate with each other through cellular, Wi-Fi or other means to the service platforms. The sensors are typically devices, which detect, for example, audio, video, motion, light, weather or other conditions. The costs associated with providing such upgrades and/or networked services to a lighting infrastructure owner may be offset by fees received from information provided as part of the LIAF to applications that use information from the lighting infrastructure owner's lighting node platforms.

In another embodiment, a system may provide a network of sensors for collecting information by using existing lighting systems having fixtures with light sources. The method includes replacing the light source at each fixture with a module that includes a power input terminal connected to the power supply of the existing light fixture, a replacement light source, a processor, a network interface coupled to the processor, and a sensor coupled to the processor. The sensor detects a condition at the lighting node platform, and provides information about that condition to the processor. The network interface of each module at each fixture is coupled together using a communications network. Using the communication network, information is collected from the sensors, and that information is provided over the network to a computing device.

In another embodiment, each module at each of the fixtures includes a controller and apparatus coupled to the controller, and the controller is used to cause actions to be performed by the apparatus. As mentioned above, signals may be transmitted from the computing device over the communication network to the modules and thereby to the controllers to cause an action to be performed by the apparatus of the lighting system. In various embodiments, such controllers may be software and/or hardware.

In each of these additional embodiments, various methods and systems may be used to determine costs and revenues associated with sensors and other devices available at particular lighting node platforms in a LIAF, based in part on whether processing and energy consumed in providing sensor and apparatus access to applications is performed in part locally at the lighting node platform or remotely at a server computer operated by a provider of the LIAF. Thus, in alternative systems, different revenue models may be used to improve access and integration to devices within a LIAF.

Embodiments described herein relate to networks of devices in a Lighting Infrastructure Application Framework or network (referred to herein as "LIAF"). In particular, revenue applications and operation of access controls and revenue streams associated with such a network are described. The LIAF as described here is based on lighting node platform, gateway and service platforms with various alternative embodiments for providing access to information from the LIAF. In certain embodiments, a lighting node platform architecture consists of a lighting node platform which is deployed at various locations in the lighting infrastructure (e.g., at individual street light fixtures). At least some of the lighting node platforms include sensors that collect and report data to other lighting node platforms, and in some cases to higher levels in the architecture. Sensor data or controller access for sensors and controllers within the LIAF may then be provided to various applications. The applications may register with the LIAF to enable the application to access data from the LIAF. Operators of such an application may, for example, pay a fee for access to some or all of the information available from the LIAF. In other embodiments, individual application users may pay for access to LIAF information, or individual users may agree to enable advertising in exchange for receiving data from the LIAF.

Thus, as described herein system users and application providers may support and fund the operation of a LIAF as well as the expenses associated with leasing lighting node platform locations or other such costs associated with a LIAF. FIG. 1A illustrates a portion of the overall architecture of an embodiment lighting infrastructure application framework system 100 (or a LIAF system 100). The system 100 may also be referred to as a Light Sensory Network (LSN). A light pole 102, such as a street light, may include a lighting node platform 104 (or lighting node platform device) in addition to the light source itself. The lighting node platform 104 may include sensors 116 of various types selected by the owner of the light pole 102, depending upon the particular application desired. Certain embodiments may for example, include an ambient light or daylight sensor 117. Alternative embodiments may include an occupancy sensor 118 that may identify when a space is filled by an object, such as a car in a particular parking space. In various embodiments, sensors 116 may include any combination of sensors, such as occupancy sensors 118, energy usage sensors, light sensors (e.g., daylight sensor 117, ambient light sensors, light level sensors, etc.), environmental sensors, (e.g., temperature sensor, wind sensor, humidity sensor, weather sensor, pollution sensor, particulate sensor, barometric pressure sensor, etc.), security sensors (e.g., motion detection sensor, glass break sensor, video/audio sensors, etc.), audio/microphone sensors, cameras (e.g., video cameras, etc.), gas detection sensors (e.g., carbon dioxide sensor, carbon monoxide sensor, methane sensor, natural gas sensor, oxygen sensor, propane sensor, butane sensor, ammonia sensor, hydrogen sulfide sensor, etc.), intrusion detectors, motion sensors, vibration sensors, people detection sensors, vehicle detection sensors, safety sensors (e.g., radiation sensor, other toxic gases sensors, etc.), biohazard sensors, scanning sensors (e.g., active, passive, and hybrid RFID), location sensors (e.g., GPS), biometric sensors (e.g., Human Presence), mechanical sensors (e.g., Force/Strain, accelerometers, etc.), signal detectors (e.g., radio frequency detector, WiFi detector, Bluetooth detector, etc.), and industry specific sensors (e.g., traffic, parking, medical, law enforcement, earthquake sensors, gunshot sensors, etc.). The lighting node platform 104 may also include controllers 120 for performing functions in response to the sensors 116, or performing functions in response to control signals received from other sources. Three potential controllers which may be used in various embodiments are an irrigation control 121 for controlling an irrigation system, a gate control 122 for opening and closing a nearby gate, and a light controller 123 for controlling a light in a light pole 102. The light controller 123 may be used to control the lighting source in the light pole 102, for example, turning it off or on at different times of the day, dimming it, causing it to flash, sensing the condition of the light source itself to determine whether maintenance is required, or providing other functionality. In various embodiments, the controllers 120 may be hardware and/or software. For example, a controller for controlling an exhaust fan may be software.

Other examples of control functions which these or similar hardware and/or software controllers 120 enable may include: management of power distribution, measurement and monitoring of power, and demand/response management. In various embodiments, the software controllers may run on the node platform 104, a node application controller as described below, or a specialized controller platform. The controllers 120 may activate and deactivate sensors, and may measure and monitor the sensor outputs. In addition the controllers 120 may provide management for communication functions such as gateway operation for software downloading and security administration, and for video and audio processing, for example detection or monitoring of events. In an embodiment, the lighting node platform 104 and controllers 120 may utilize a standard controller action invocation interface 156 that may invoke controller actions based on detected sensor data.

In an embodiment, the architecture of the networked lighting system may enable "plug-and-play" deployment of sensors 116 at the lighting node platforms 104. The Lighting Infrastructure Applications Framework (LIAF) may provide hardware and software to enable implementation of the sensor plug-and-play architecture. When new sensors are deployed, software and hardware may manage the sensor, but the LIAF may provide support for generic functions associated with the sensors; thereby eliminating the need for custom hardware and software support for sensors. A sensor requires power, typically battery or wired low voltage DC, and in certain embodiments the sensor may generate analog or digital signals as output.

The LIAF may allow deployment of sensors 116 at lighting node platforms 104 without additional hardware and software components. LIAF may provide DC Power 150 to sensors 116 as required. The LIAF may also monitor the analog or digital interface 152 associated with the sensors 116, as well as all other activities at the lighting node platform 104.

Lighting node platforms 104 at individual light poles 102 (e.g., street lamps, lighting fixtures, etc.) may be coupled together to a gateway platform 106. The gateway platform 106 communicates with lighting node platforms 104 using technology as described further below, but can include a wireless connection or a wired connection. In an embodiment, the gateway platform 106 and lighting node platform 104 may communicate via Ethernet, either wired or wireless. In an embodiment, the gateway platform 106 and lighting node platform 104 may utilize interfaces 154, such as a standard administrative interface (e.g., an interface activating, deactivating, and initializing sensors) and/or a standard operational interface (e.g., an interface for obtaining and converting analog or digital sensor data to an event type). The gateway platform 106 may, in certain embodiments, communicate with the network 112 using wide area network communications technology 108 such as broadband network, cellular network, Wi-Fi, general packet radio service (GPRS), or other means (e.g., cell towers, WiFi routers, access points, Ethernet switches, IP routers, etc.). Of course, the gateway platform 106 may not be a stand-alone implementation. In an embodiment, the gateway platform 106 may be deployed at a lighting node platform 104 or alternatively may be optional. For example, in an embodiment, the lighting node platform 104 may perform the operations/functions of the gateway platform 106. The gateway platform 106 may provide wide area networking (WAN) functionality and provide complex data processing functionality, in addition to the functions provided by the lighting node platform 104.

The gateway platform 106 may access a service platform 110 enabling the lighting node platform 104 to provide data to, or receive instructions from, various applications 114. Service platform 110 may be implemented in the cloud to enable various applications or services. The service platform 110 may be associated with a variety of applications 114 for the system 100. In an embodiment, the service platform 110 may utilize various application interfaces, such as an interface for applications to access data generated by sensors and/or events defined for sensors/sensor data. These applications 114 may be provided by owners, partners, consumers, or other entities to enable desired functionality of the lighting infrastructure or other business/commercial needs. One potential application, for example, may provide reports on current weather conditions at a lighting node platform 104. The applications 114 may be usually developed by others and licensed (or alternatively provided at no charge) to the lighting infrastructure owner, but they can also be provided by the lighting node platform owner or otherwise made available for use on various lighting node platforms 104. In an embodiment, the applications 114 and/or data associated with the applications 114 may be exchanged via various administrative and operational interfaces 158 over the network 112. In various embodiments, the applications 114 may be included within or accessed by user devices 130 (e.g., mobile devices, laptops, third-party developer servers, etc.). In other embodiments, the applications 114 may also be included within the service platform 112 (e.g., hosted/executed/stored by service platform computers, etc.).

Typical lighting related applications may include lighting control, lighting maintenance, and energy management. For example, a lighting control application may allow users to control light output at a lighting node platform 104 on a light pole 102. There also may be partner applications—applications that have access to privileged or confidential data and to which the lighting infrastructure owners grant privileges. Such applications may provide security management, parking management, traffic reporting, environment reporting, asset management, logistics management, and retail data management to name a few. There may also be consumer applications that may enable consumers to have access to generic data, with access to this data granted, for example, by the lighting infrastructure owner. In an embodiment, the consumer applications may be configured to utilize anonymized data that is managed and/or authorized for distribution by a service platform 110 or other computing device. Another type of application may include owner-provided applications, which may be applications developed and used by lighting infrastructure owners (e.g., for controlling traffic flow in a region or along a municipal street). Of course there may also be applications that use customized data from the framework.

In various embodiments, the primary entities involved in the system illustrated in FIG. 1A may include a lighting infrastructure owner (e.g., a parking garage owner), an application framework provider (e.g., an operator of the LIAF), an application or application service owner (e.g., a third-party service or developer), and end users (e.g., citizens with cars, etc.). Typical lighting infrastructure owners may include a municipality, a building owner, tenants, a facility maintenance company, and/or other entities. For example, lighting infrastructure owners may be those entities that maintain a lighting infrastructure (e.g., a parking garage), bill tenants for the use of the lighting infrastructure, or alternatively pay fees to other parties for use of a lighting infrastructure (e.g., tenants pay owners/third-parties to maintain a parking garage, etc.).

Figure 1B:
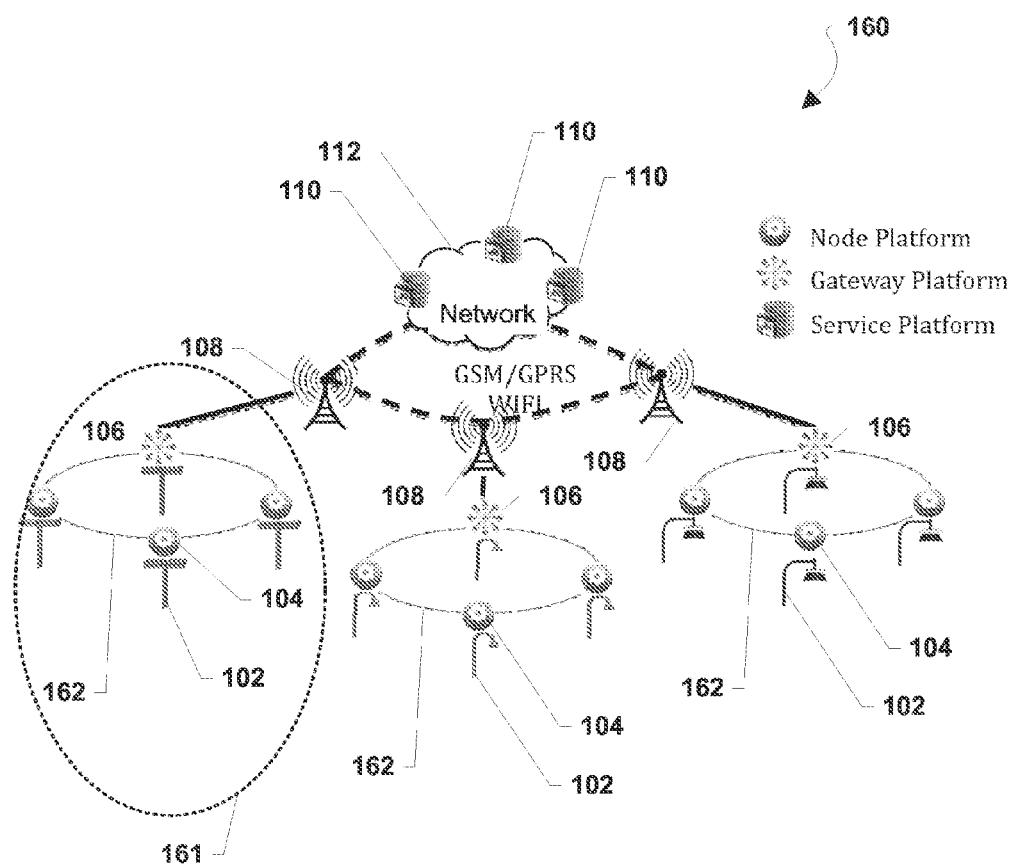
FIG. 1B is a component block diagram illustrating an embodiment architecture of a networked lighting system at a higher level with emphasis on networking.

FIG. 1B illustrates the architecture of a LIAF system 160 at a higher level with emphasis on networking. Groups of light poles 102 with lighting node platforms 104 may communicate with each other and to gateway platforms 106. The gateway platforms 106 may communicate, in turn, through communication media or communications technology 108 (e.g., global system for mobile communications or "GSM", GPRS, WiFi, and other WAN connections) to the network 112. In a typical implementation as illustrated, there may be multiple sets of lighting node platforms 104, multiple gateway platforms 106, and multiple communication media 108, all commonly coupled together to the service platforms 110 available through the network 112. In this manner, multiple applications may provide a wide degree of functionality to individual lighting node platforms 104 through the gateway platforms 106 in the LIAF system 160.

FIG. 1B also illustrates the networking architecture for an array of lighting node platforms. In the left hand section of the drawing, an array of lighting node platforms 161 is circled for illustration. Solid lines among the lighting node platforms 104 within the array 161 represent the data plane that connects selected lighting node platforms 104 to enable high local bandwidth traffic shown as local area network (LAN) communication media 162. These connections (or LAN network), for example, may enable the exchange of local video or logged data among these lighting node platforms (e.g., data may be exchanged between the lighting node platforms 104 of the same array 161). The LAN communication media 162 may enable a control plane that connects all of the lighting node platforms 104 to each other and may provide transport for local and remote traffic, exchanging information about events, usage, node status, and enabling control commands from the gateway, and responses to the gateway platform 106 to be implemented. In an embodiment, the LAN communication media 162 may utilize WiFi, 4G/LTE or other data communications technology. For example, lighting node platforms 104 may include DASH7 sensors and/or readers to publish performance, sensor, usage, and/or application data. Other embodiments may include WiFi, ZigBee and other 802.15-based protocols.

Figure 2:
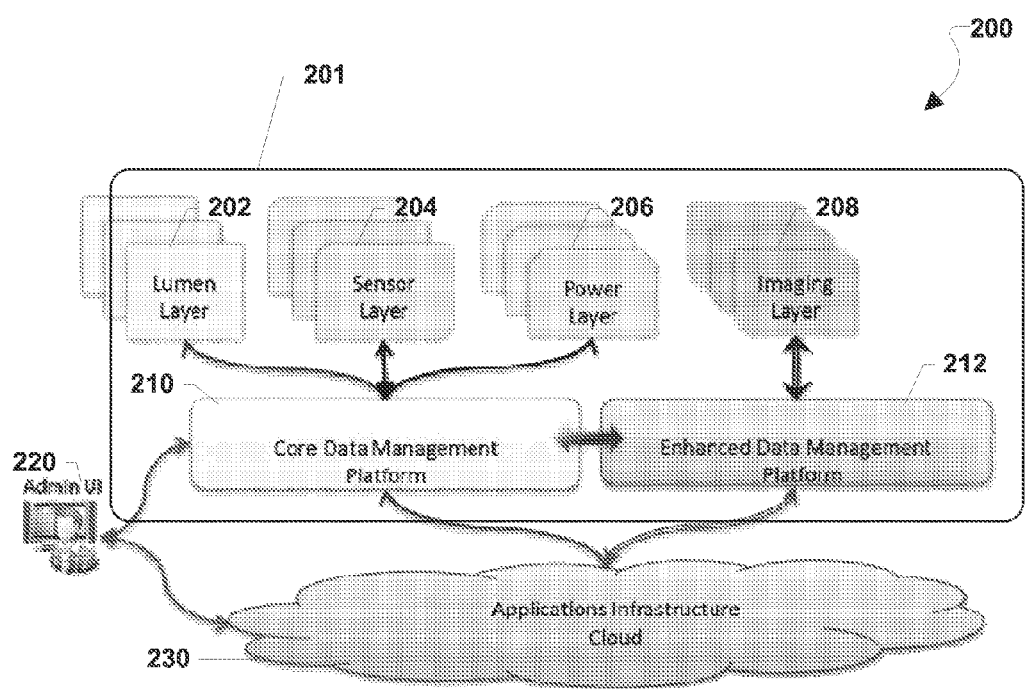
FIG. 2 is a component block diagram illustrating an embodiment architecture of a lighting infrastructure application framework system.

FIG. 2 illustrates components within an embodiment LIAF system 200. In an embodiment, various components may be associated with a lighting infrastructure 201 (e.g., a parking garage, etc.). A lumen layer component 202 may include a light fixture/heat-sink, a socket for plugging in or screwing in a lighting device (e.g., an OLED or LED, LED board, incandescent light, fluorescent light, etc.), a power interface (e.g., a DC interface), a thermal feedback module, a dimming interface to a controller, and various related drivers/software/instructions. In an embodiment, the lumen layer component 202 may include a lumen management layer (not shown) for processing data exchanged with other devices within the system 200. A sensor layer component 204 may include various sensors, such as occupancy sensors, energy usage sensors, motion detectors, light sensors (e.g., daylight sensors, ambient light sensors, light level sensors, etc.), environmental sensors, (e.g., temperature sensor, wind sensor, humidity sensor, weather sensor, pollution sensor, particulate sensor, barometric pressure sensor, etc.), security sensors (e.g., motion detection sensor, glass break sensor, video/audio sensors, etc.), audio/microphone sensors, cameras (e.g., video cameras, etc.), gas detection sensors (e.g., carbon dioxide sensor, carbon monoxide sensor, methane sensor, natural gas sensor, oxygen sensor, propane sensor, butane sensor, ammonia sensor, hydrogen sulfide sensor, etc.), intrusion detectors, vibration sensors, people detection sensors, vehicle detection sensors, safety sensors (e.g., radiation sensor, other toxic gases sensors, etc.), biohazard sensors, scanning sensors (e.g., active, passive, and hybrid RFID), location sensors (e.g., GPS), biometric sensors (e.g., Human Presence), mechanical sensors (e.g., Force/Strain, accelerometers, etc.), signal detectors (e.g., radio frequency detector, WiFi detector, Bluetooth detector, etc.), and industry specific sensors (e.g., traffic, parking, medical, law enforcement, earthquake sensors, gunshot sensors, etc.). In an embodiment, the sensor layer component 204 may include a sensor management layer (not shown) for processing data exchanged with other devices within the system 200. A power layer component 206 may include an AC/DC adaptor (such as an adaptor that indicates power usage, voltage, current power, etc.) and a step-down transformer. In an embodiment, the power layer component 206 may include a power management layer (not shown) for processing data exchanged with other devices within the system 200. An imaging layer component 208 may be included that is configured to store, analyze, and otherwise process various image types, such as static, motion, and infrared imagery), various image qualities (e.g., low, medium, high definition, etc.), as well as perform operations for implementing and/or adjusting image recognition and image communication frequency. Additional layers such as an audio layer (not shown) may be included to process data from audio sensors associated with lighting node platform devices.

In an embodiment, a core data management platform component 210 may include hardware elements, such as analog/digital inputs and outputs, DC power distribution and measurement units, microcontrollers/processors, buses, ports, pins, and interfaces (e.g., for LAN, other platform components, etc.). The core data management platform component 210 may also include software elements, such as instructions, commands, scripts, or routines for handling sensor data inputs/outputs, DC power measurement on various channels, low bandwidth communications (e.g., radio frequency signals) between lighting node platforms and gateway platform devices (or site controllers as described below), and LED dimming based on sensor data and/or application commands. In an embodiment, an enhanced data management platform component 212 may include hardware elements, such as a micro processor (e.g., high-end Open Multimedia Applications Platform or "OMAP"), buses, ports, pins, and interfaces (e.g., for high bandwidth LAN, high bandwidth WAN/WIFI/etc., other platform components, etc.). The enhanced data management platform component 212 may also include software elements for handling video processing/interface and high bandwidth communications (e.g., communications between lighting node platforms, gateway platform devices, etc.).

In various embodiments, the components 202-212 may be within or performed by a lighting node platform, gateway platform, site controller computing device, or any combination of devices associated with a lighting infrastructure 201.

The system 200 may further include an applications infrastructure cloud 230. Such a component may include various computing devices, routines, modules, logic, and networking elements to enable service platforms as described below with reference to service platforms. For example, the applications infrastructure cloud may be configured to perform data collection related to lighting, power, sensors, and video, as well as perform administrative operations regarding lighting node platforms.

Figure 3:
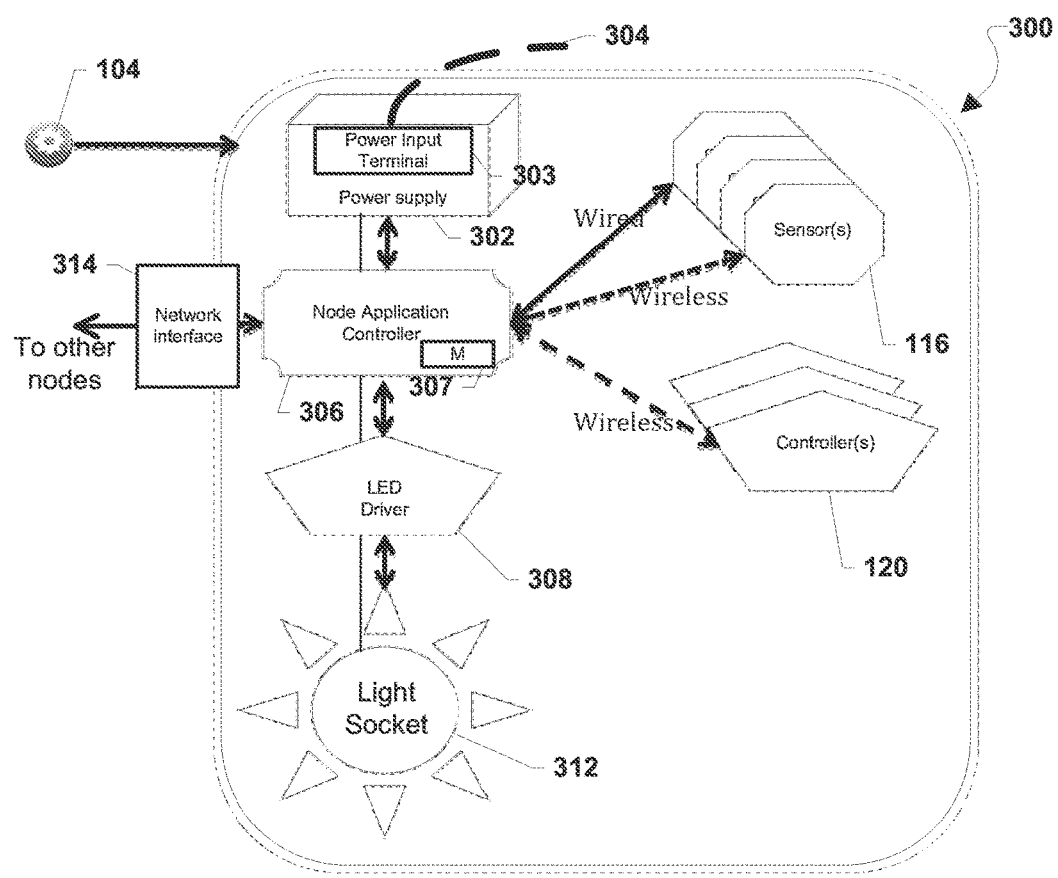
FIG. 3 is a component block diagram illustrating an embodiment lighting node platform.

FIG. 3 illustrates a diagram 300 of an embodiment lighting node platform 104 (or lighting node platform device). The lighting node platform 104 may include a power supply 302 (or power terminal block), typically implemented as an AC to DC converter. In an embodiment where lighting node platforms are deployed at outdoor street lamps, AC electrical power may be the primary power supply to such street lamps. Because most of the sensors and controller structures may use semiconductor-based components, the power supply 302 may convert the available AC power to an appropriate DC power level for driving the various lighting node platform components. In an embodiment, the power supply 302 may include and/or be coupled to a power input terminal 303. In an embodiment, a pole wire 304 may be connected to the power supply 302, such as by connecting to the power input terminal 303.

As also shown in FIG. 3, the array of sensors 116 and controllers 120 may be connected to the power supply 302. In various embodiments, the controllers 120 may be software and/or hardware. A node application controller 306 (or processor) running an application may coordinate the operations of the sensors 116 and controllers 120 to implement the desired local functionality. The node application controller 306 may also provide communication via an appropriate media, such as a local network interface 314, to other lighting node platforms. The application executing via the node application controller 306 may also drive an LED driver 308 (or LED driver circuit), coupled to an appropriate light socket 312 (i.e., a socket for a light source, bulb, etc.), operating under control of one of the controllers 120. Wired and wireless connections between the various components may be provided as required in various alternative embodiments. In various embodiments, the node application controller 306 may be coupled to or include a memory 307 (e.g., RAM).

The lighting infrastructure of the lighting node platform 104 shown illustrates one embodiment of a lighting node platform 104 which is a lighting node platform including a luminaire light socket 312 (i.e., a socket for a luminaire light source), a light emitting diode (LED) driver 308, a node application controller 306, a local network interface 314, and a power supply 302. In certain embodiments, the node application controller 306 may be coupled to a controller(s) 120 and/or sensor(s) 116. The sensors 116 associated with the lighting node platforms 104 can be local to the lighting node platform, or they can be remote. Controllers 120, other than the LED controller, can be hardware and/or software based and may be remote and use wireless communications. The node application controller 306 may manage all the functions within the lighting node platform 104. It also may implement the administrative, data collection and action instructions associated with applications. These instructions may be delivered as application scripts to the node application controller 306. In addition, the software on the node application controller 306 may provide activation, administration, security (authentication and access control) and communication functions.

The local network interface 314 may enable the lighting node platform 104 to communicate with a gateway platform device that is part of a local area network including one or more lighting node platforms 104 and a gateway platform that enables the lighting node platforms to communicate with the rest of the LIAF network.

Figure 4:
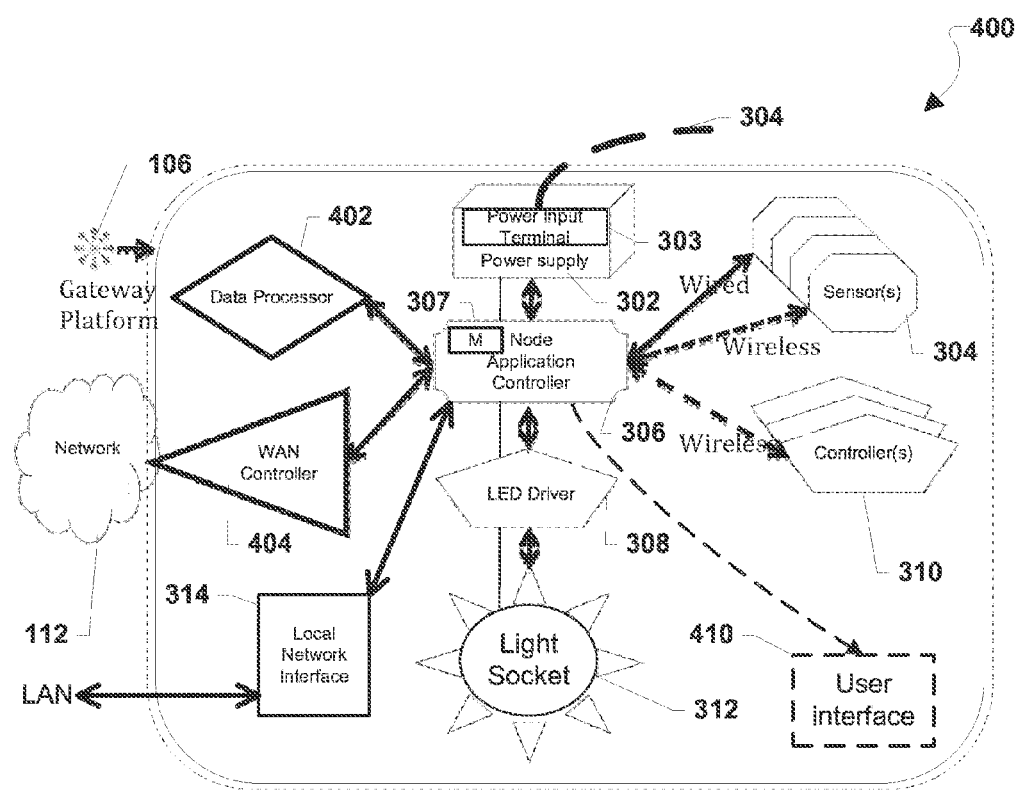
FIG. 4 is a component block diagram illustrating an embodiment gateway platform.

FIG. 4 illustrates a diagram 400 of a gateway platform 106 (or gateway platform device). As suggested by the figure, and mentioned above, in an embodiment, the gateway platform 106 may be located at a lighting node platform or separately from the lighting node platforms. In other words, the gateway platform 106 may be configured to include or otherwise utilize at least the resources of a lighting node platform. Accordingly, the gateway platform 106 may incorporate a power supply 302, node application controller 306 with a memory 307, local network interface 314 for communications via a local area network (or LAN), LED driver 308 and light socket 312, as well as sensors 116 and controllers 120. The gateway platform 106 may additionally include a wide area network (WAN) controller 404 that may enable communication with a service platform via a WAN communication media or WAN network interface. For example, the gateway platform may exchange messages with the network 112 via the WAN controller 404. In an embodiment, a pole wire 304 may be connected to a power input terminal 303 coupled to or contained within the power supply 302.

Figure 12A:
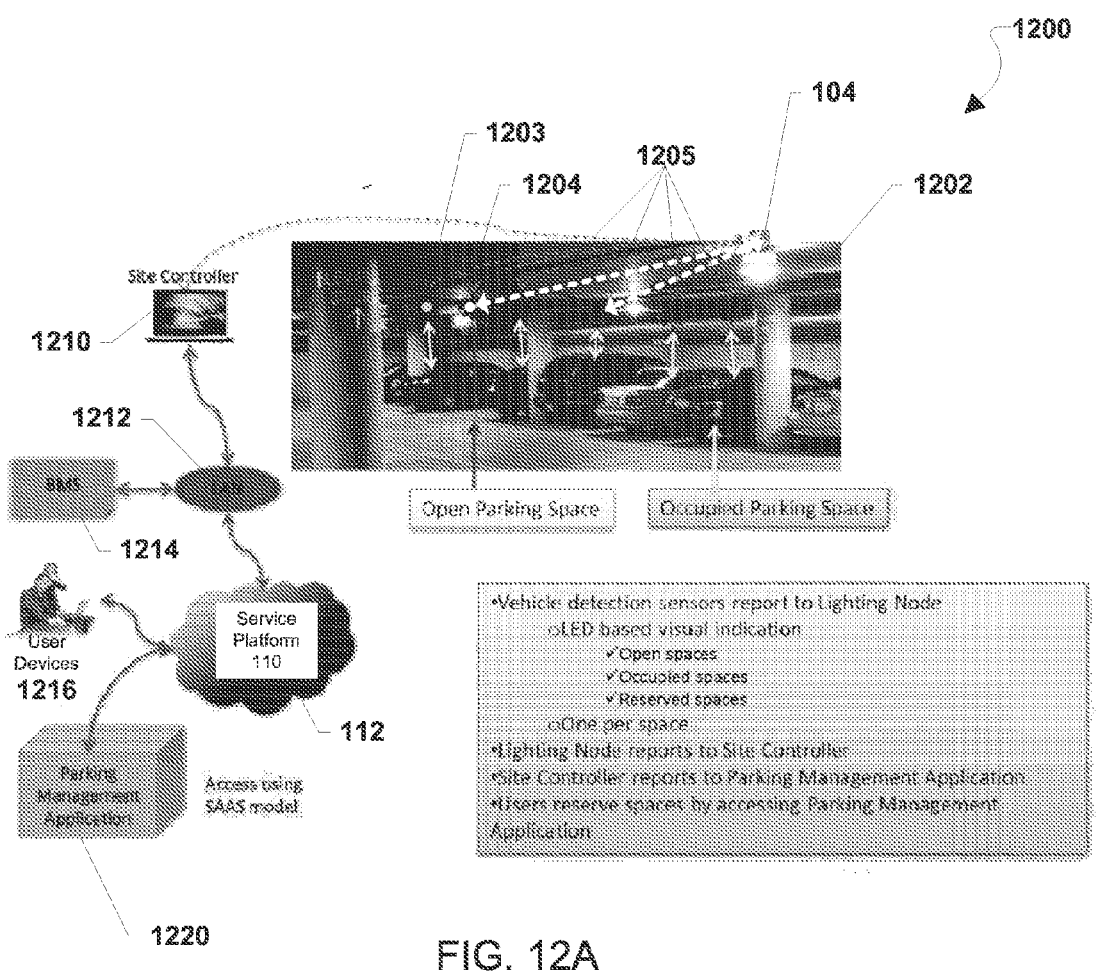
FIGS. 12A, 12B, 13 are diagrams illustrating embodiment applications of processing data associated with lighting node platforms within a lighting infrastructure application framework.
Figure 13:
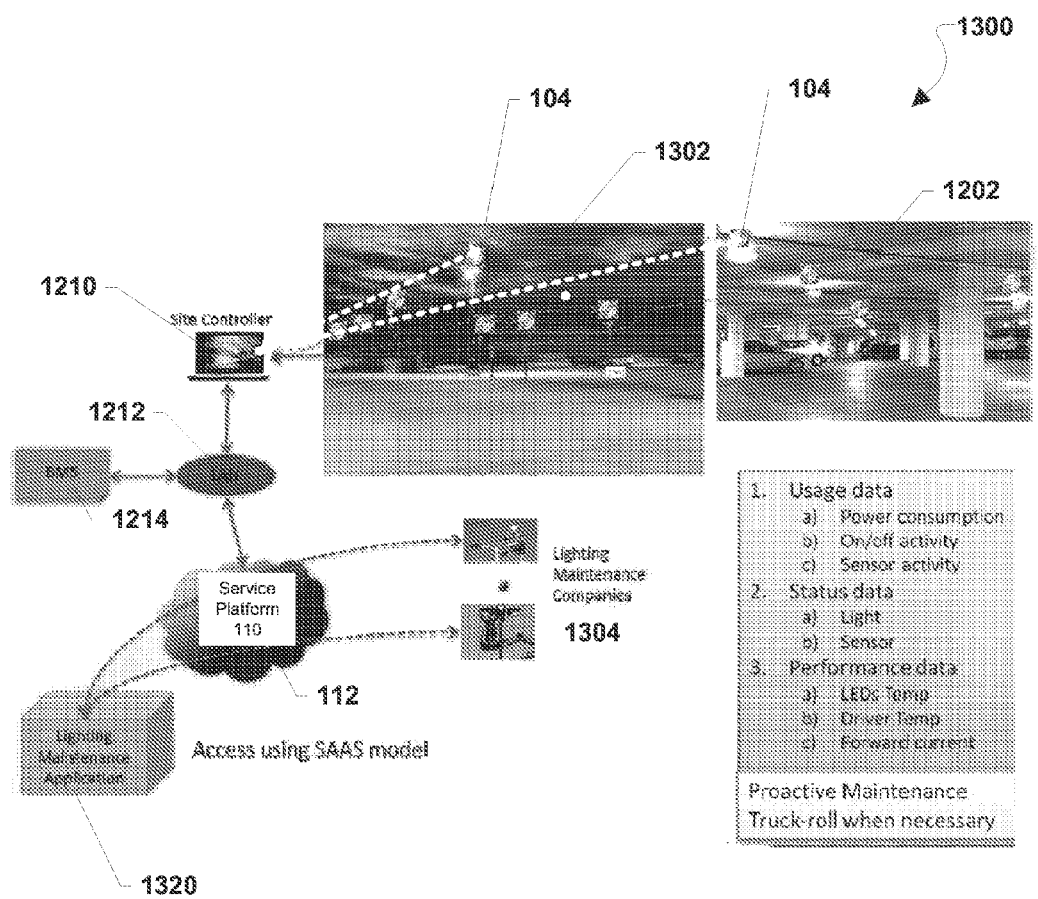

The gateway platform 106 hardware and software components may enable high bandwidth data processing using a data processor 402, such as processing when receiving/transmitting high video rates. These components may also enable WAN communications via the WAN controller 404, in addition to the functions supported by lighting node platform as described above. The gateway platform 106 can be thought of as a lighting node platform, but with additional functions. The high bandwidth data processing via the data processor 402 may support video and audio data processing functions that detect, record and report events (e.g., glass breaking, crowd formation, gun shots, etc.). The WAN functionality support via the WAN controller 404 may be based on GSM, GPRS, Wi-Fi, LAN to Internet, or other wide area networking technologies. In an embodiment, the gateway platform 106 may also include a user interface 410, such as displays and/or input devices that may provide user access to data from lighting node platforms and/or service platforms associated with the gateway platform 106. In various embodiments, when the gateway platform 106 is configured with the user interface 410 it may be referred to as a "site controller," such as shown in FIG. 12A and FIG. 13. In other words, a "site controller" device may be a type of gateway platform 106 device.

Figure 5A:
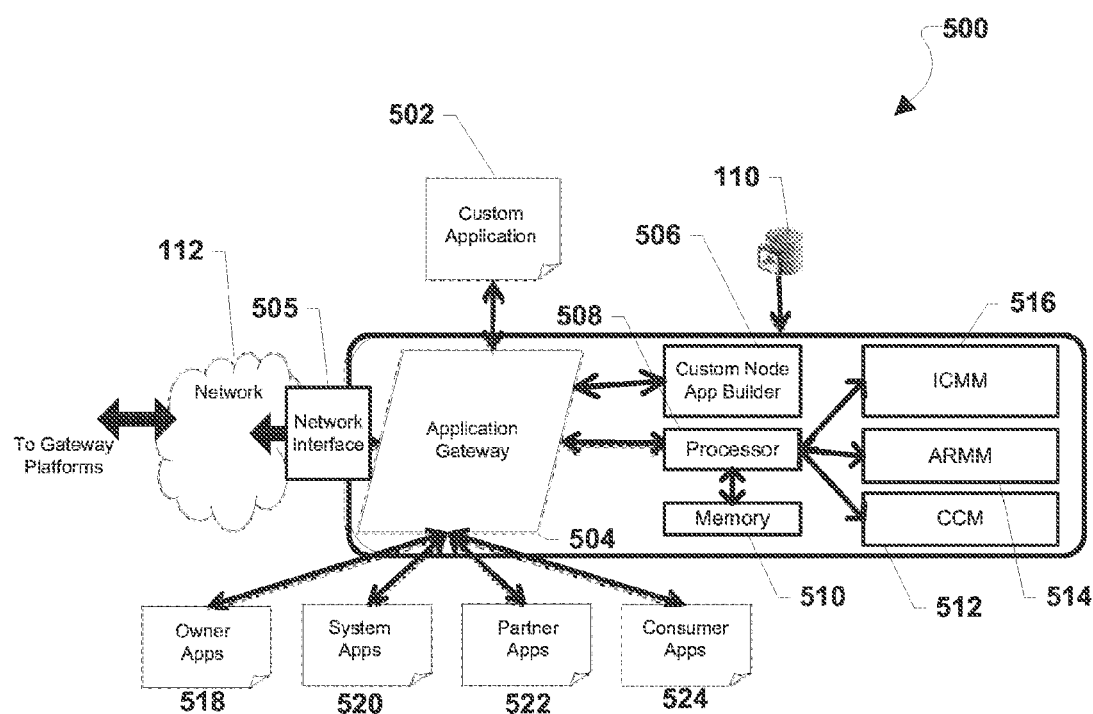
FIG. 5A is a component block diagram illustrating an embodiment service platform.

FIG. 5A illustrates a diagram 500 of an embodiment service platform 110 (or service platform device). The service platform 110 may include a processor 508 and memory 510 for implementing various modules and for analyzing data via modules such as infrastructure cost management module 516 (referred to in FIG. 5A as "ICMM"), application revenue management module 514 (referred to in FIG. 5A as "ARMM"), and carbon credit module 513 (referred to in FIG. 5A as "CCM"). The service platform 110 may utilize a network interface 505, such as a WAN network interface. The service platform 110 may support an application gateway component 504 and a custom node application builder component 506. The application gateway component 504 may be configured to manage interfaces to different types of third-party applications implemented to use the sensor data from the lighting node platforms. The custom node application builder component 506 may enable development of custom node application scripts. These scripts may specify to the node application controllers, such as the node application controller 306 of FIG. 3, to implement data collection instructions and operations to be performed at the lighting node platform level. The scripts may specify to the application gateway component 504 how the results associated with the script are provided to an application, such as a custom application 502. In an embodiment, the application gateway component 504 may be configured to exchange data with gateway platforms (and thus lighting node platforms) via the network 112, such as using WAN communication media.

The service platform 110 may also be configured to exchange and process data related to various applications. In particular, owner applications 518, system applications 520 (or system operator applications), partner applications 522, and consumer applications 524 may utilize the application gateway component 504 via application gateway APIs. Various types of applications may be developed in a way that is common to many uses of the sensor data. System applications 520 may be developed by a LIAF system operator and may include an application for lighting management of various lighting node platforms that provides lighting status and controls functionality for the light source at a certain lighting node platform. As another example, system applications 520 may include another application provided by a LIAF system operator for lighting maintenance that enables users to maintain their lighting network, for example, by monitoring the status of the light(s) at each lighting node platform. In yet another example, system applications 520 may include another application for energy management that enables users to monitor lighting infrastructure energy usage and therefore to better control that use. For example the application may provide an interface to auto-demand/response applications. Partner applications 522 may be developed by a lighting infrastructure owner (e.g., a light pole owner) and LIAF operator-approved application and application service companies that have established markets for various desired functions, such as those listed below. These applications may utilize the application gateway API Functions of partner applications 522 may include security management, parking management, traffic reporting, environment reporting, asset management, and logistics management. Consumer applications 524 may utilize an API for consumers as provided by the LIAF system operator. This API may provide access to publicly available, anonymous and owner approved data. Examples of consumer applications 524 may include third-party applications that use anonymized data (or generic data) to provide information to users, such as weather (or environmental) information for various locations, traffic information at a location, and information for finding parking spaces in an area (e.g., available spaces, prices for parking, etc.). In an embodiment, consumer applications 524 may utilize a zip code key provided by users to provide relevant data from lighting infrastructures. Owner applications 518 may be developed and used by lighting infrastructure owners to meet their various specific needs (e.g., management of facilities, etc.).

Examples of owner applications 518 may include applications that illustrate security conditions in a parking lot, parking administration applications, and revenue applications (e.g., monetization programs, etc.).

In various embodiments, the infrastructure cost management module 516 and the application revenue management module 514 may function to analyze LIAF component usage and automatically determine usage based fees and revenue. Embodiment methods of automatic fee and revenue calculation operations are described below.

Figure 5B:
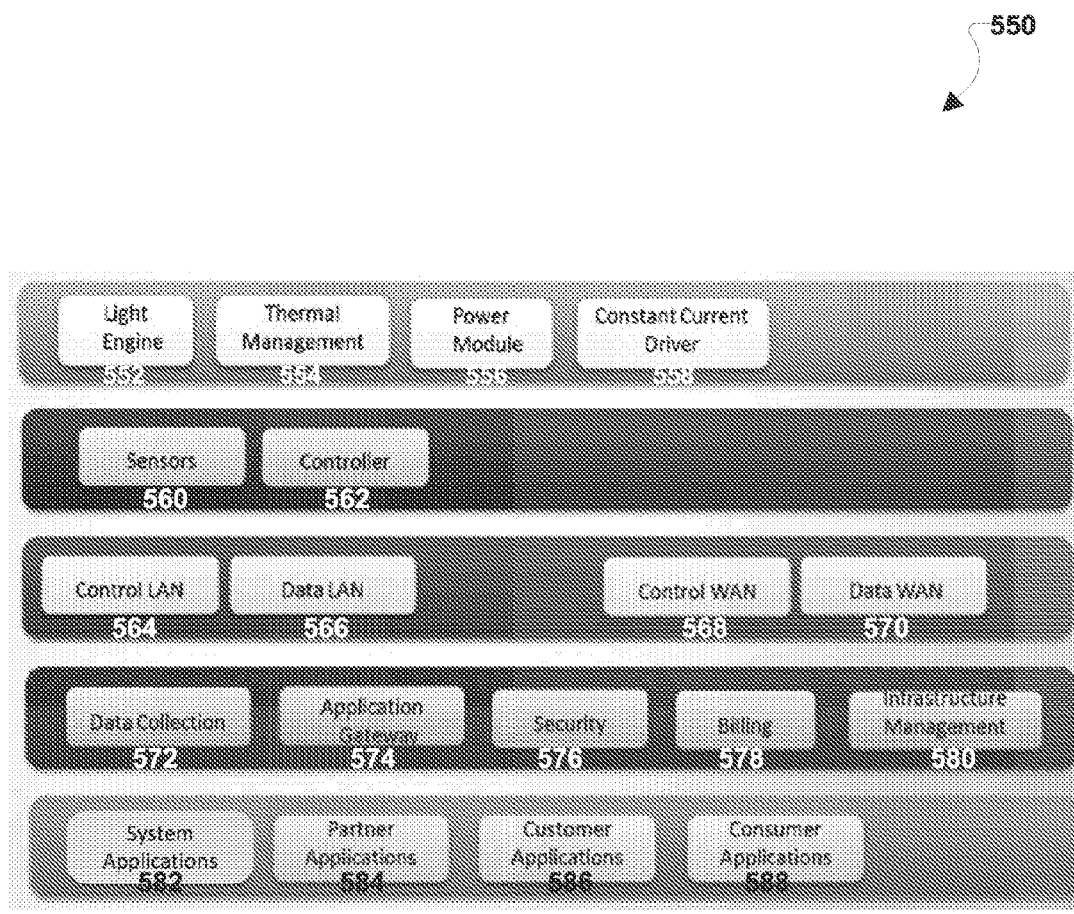
FIG. 5B is a component block diagram illustrating embodiment components within a lighting infrastructure application framework.

FIG. 5B illustrates embodiment components within a lighting infrastructure application framework. In other words, FIG. 5B shows typical components within a layered architecture 550 that includes lighting node platforms, gateway platforms, service platforms, and applications (e.g., third-party applications). In particular, the light engine component 552, thermal management component 554, power module component 556, constant current driver component 558, sensors component 560 and controller component 562 may be typical components of a lighting node platform (or lighting node platform device) or a gateway platform (or gateway platform device) as described above. The lighting node platform may also include network layer components, such as a control LAN component 564 and a data LAN component 566. The gateway platform may include network layer components, such as a control WAN component 568 and a data WAN component 570. In an embodiment, the control LAN component 564, the data LAN component 566, and the control WAN component 568 may include functionality for time syncing and event/control/admin traffic processing, and the data WAN component 570 may include functionality for processing video frames.

The service platform may include various components associated with managing data services and applications, such as a data collection component 572 for processing various collected data (e.g., sensor data, lighting, power, video, audio data, etc.), an application gateway component 574 for providing data access to various applications (e.g., customer applications, partner applications, system applications, consumer applications, etc.), a security component 576 for authentication, data and communications access control, a billing component 578 for processing bills to parties based on access, usage, data views, and near real-time/periodic/historic frequencies, an infrastructure management component 580. In an embodiment, the infrastructure management component 580 may include functionality for handling graphical user interfaces (GUI), gateway administration, network administration, user administration, the management/syncing/control of lighting node platforms (e.g., processing failures, software, and operations/status), and administration of lighting node platforms (e.g., setup, configuration, etc.).

In various embodiments, the components or analogous logic, circuitry, or operations may be included within (or performed by) any combination of computing devices within the lighting infrastructure applications framework, such as lighting node platforms, gateway platforms, site controllers, and other computing devices connected to lighting infrastructures. In various embodiments, the various applications components 582-588 may be within the service platform or alternatively external to the service platform, such as components associated with the parties that develop applications.

In various embodiments, a LIAF may be used to generate revenue for various entities that contribute to the LIAF. As described above, lighting infrastructure owners may contribute the lighting and power facilities (poles, fixtures, etc.), LIAF operators may provide the hardware, software, network and configuration and monitoring resources to enable applications and application services on a day-to-day basis, and application providers (or application service providers) may contribute the functionality used by end user devices. Based on these contributions, a business scheme may be implemented by which revenue may generated by an LIAF operator, applications operators (e.g., third-party app developers), and lighting infrastructure owners based on the sharing, communication, storing, and processing of data, applications, and services associated with the LIAF.

Stakeholder entities related to a LIAF may include all entities who may receive revenue, monies, benefits, credits, or other compensation for their participation in the network. In particular, the owners of the lighting infrastructure may be key stakeholders of the lighting infrastructure based applications. These owners are the entities that own the light-pole/fixture and the property on which the lighting infrastructure is located. Lighting may be a cost center because of capital investment, energy related monthly bills and additional maintenance costs. Lighting infrastructure owners may be compensated (or reimbursed) for permitting lighting node platforms to be installed and utilized within their properties. Lighting infrastructure owners may typically receive revenues from LIAF operators in exchange or based on data collected from the lighting node platforms within lighting infrastructures (e.g., authorized access). Revenue to lighting infrastructure owners may also come from application partners based on various agreements. This revenue may permit lighting infrastructure owners to offset at least some of the capital, operational, and maintenance expenses associated with lighting node platforms and related elements of the LIAF that are deployed within the lighting infrastructures.

Another key stakeholder may be the LIAF operators (or LIAF service providers). These may be the entities that provide hardware and software platforms deployed within lighting infrastructure (e.g., parking garages, etc.) to provide the data and services on a day-to-day basis for various applications. Revenues to LIAF operators may be from application providers/owners using data from LIAF, which such revenues based on the type, frequency, amount of the data provided to application providers, the location and demand for data (or data demand), and well as the time frame required for the data. LIAF operators may also receive revenue based on transmitting/storing/processing custom data requested by custom application vendors. In an embodiment, LIAF operators may also receive revenues based on applications developed by the LIAF operators (e.g., applications for business using the LIAF data, such as in a retail environment/context). In various embodiments, the LIAF operators may receive various revenues from application and application service developers based on the type or use of shared data. For example, LIAF operators may receive revenue for providing access to custom, aggregated, correlated, and/or specific data, such as data indicating energy usage (voltage and current), light status, environmental info (e.g., temperature), light presence, gas presence (e.g., carbon monoxide, etc.), accelerometer status, intrusion detector status, wireless signaling information (e.g., Bluetooth MAC addresses, RFID data), application-specific sensor data (e.g., intrusion sensor, vibration sensor, motion sensor, audio, people detection, vehicle detection, vehicle details sensor, etc.). Various data types received and processed by the LIAF are described below.

Other important stakeholder entities may include the application providers (or operators) and owners. These entities may develop, distribute, and sell applications or application services that utilize data collected, processed and distributed by the LIAF. Revenue sources for application providers may be tied to their applications, application services, and relevant data associated with the LIAF. In an embodiment, one revenue source may be that users of an application or the application services pay a license fee or Software As A Service (SaaS) usage fee, which may be typically either time interval based, or paid as a one-time license fee. This fee may be based on different levels of usage, for example, standard, professional, and administrator. The usage fee may be dependent on the type of data (e.g. raw or summarized, real-time vs. non real-time, etc.), access to historical data, based on data priced dynamically by demand, and on the location associated with data. Another revenue source for application providers may be related to advertisers. In particular, advertisers (or businesses that want to advertise products or services to applications and application-service users) may pay advertisement fees for each application or service. In various embodiments, advertisers may be involved in applications distributed to users based on user acceptance of such exposure to advertising (e.g., opt-in/out).

Other key stakeholders may be business entities interested in buying carbon credits that are generated from energy and environmental savings achieved by installing LED lights, sensors, and networks to further improve the energy efficiency and savings. Each saved kilowatt-Hour (kWh) may result in environmental green house gas (GHG) emissions avoidance/savings. These savings may be translated to carbon credits which may then be traded to businesses that require additional carbon credits. For example, based on calculated energy savings related to a lighting infrastructure with lighting node platform devices, a service platform computer may trade, sell, or otherwise utilize carbon credits achieved via those savings.

Figure 6:
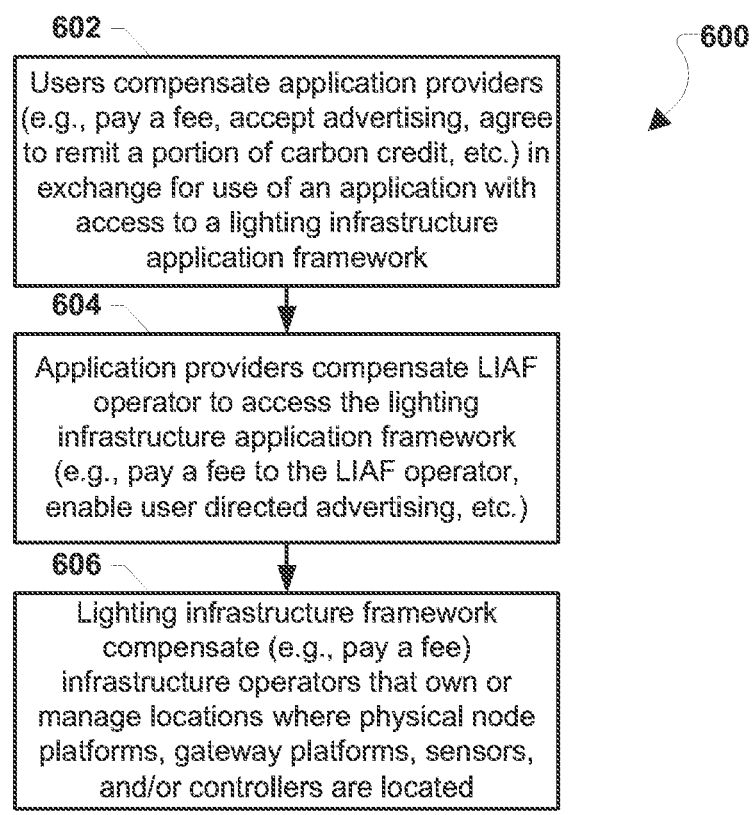
FIG. 6 is a process flow diagram illustrating an embodiment method for implementing a general revenue model within a lighting infrastructure application framework.

FIG. 6 illustrates an embodiment method 600 for implementing a general revenue model that may be used in combination with a lighting infrastructure application framework (or LIAF). In block 602, users may compensate application providers (e.g., pay a fee, accept advertising, agree to remit a portion of carbon credit, etc.) in exchange for use of an application with access to the lighting infrastructure application framework. This may involve users registering for an account with a provider of the application (e.g., a third-party app developer). Alternatively, users may register an account with the LIAF operator via a computing device associated with the service platform 110. For example, a database registration may store a link or association between a user and a user device with an application utilizing the lighting framework. The authorization for the user's devices to use applications that access a LIAF may be limited in time, data volume, number of application uses, or any other such limitation. A user may further select access to only a portion of information from a LIAF. For example, a LIAF may be associated with multiple geographic locations having different costs associated with each location, and a user may elect to receive information only from a certain geographic area. Alternatively, a user may elect to receive LIAF data only during a certain time of day, and charges may vary depending on the time of day or for times when the LIAF is at peak resource usage. Further still, in certain embodiments, a user may elect between viewing advertising in exchange for free access to at least a portion of the LIAF or paying a fee.

In block 604, application providers may compensate the LIAF operator to access the lighting infrastructure application framework (e.g., pay a fee to the LIAF operator, enable user-directed advertising, etc.). Similar to the registration and election for users described above, application providers may register with a LIAF and elect options for LIAF use by an application. For example, as described further below, a LIAF may include a wide variety of sensors and controllable devices, including cameras, temperature sensors, microphones, and other such devices. Certain applications may elect only to receive information from certain types of such LIAF devices. Additionally, any other such time, location, or other limitation on device use within the LIAF may be elected. Further still, a LIAF may provide processing resources or filters on information collected by the LIAF. For example, rather than receiving access to a camera feed, an application may instead receive analysis results from a camera feed output which may provide analysis information such as a number of pedestrians or cars passing within view of the camera. In alternative embodiments, application providers may provide such analysis services to the LIAF or to other application providers in exchange for revenue.

In block 606, the lighting infrastructure framework operator may compensate (e.g., pay a fee to) lighting infrastructure operators that own or manage locations where physical lighting node platforms, gateway platforms, sensors, and/or controllers are located. Such compensation may be flat fees, profit sharing, rent, leases, or other benefits based on the use of the small areas where physical components of a lighting node platform device, gateway platform device, sensor, controller, or other device reside. For example, a building owner may be paid a fee for providing permission to place a lighting node platform device with multiple sensors on the building. The compensation paid from the LIAF operator to the lighting infrastructure owner may be based on location, number and type of sensors and devices placed, bandwidth available to the platform, or any other such quality of the platform. The compensation may further be based on actual usage by users or applications, or may simply be a flat fee.

In various alternative embodiments, combinations of such entities may be mixed, such that a lighting infrastructure owner may be a user and an application provider, or a LIAF operator may also be an application provider, with any appropriate revenue arrangement created for revenue to flow and support the LIAF as described herein.

For illustration purposes: a revenue flow for an embodiment lighting infrastructure application framework may be initiated when a user device downloads an app configured to access data related to the LIAF. The user device may transmit over the Internet financial or other compensation information (e.g., credit card information) to a server associated with the developer of the app (i.e., an application provider) over the Internet, thus enabling revenue to the application provider. In response to receiving information from the user device (or on a periodic basis), the server associated with the developer of the app may transmit financial or other compensation information of the application provider to a computing device (or server) associated with a LIAF operator, enabling revenue to the LIAF operator. In response to receiving the information from the server associated with the developer of the app (or on a periodic basis), the LIAF operator computing device may transmit financial or other compensation information (e.g., flat fee credits, etc.) to a device associated with a lighting infrastructure owner (e.g., a parking garage owner), enabling revenue to the lighting infrastructure owner.

Figure 7A:
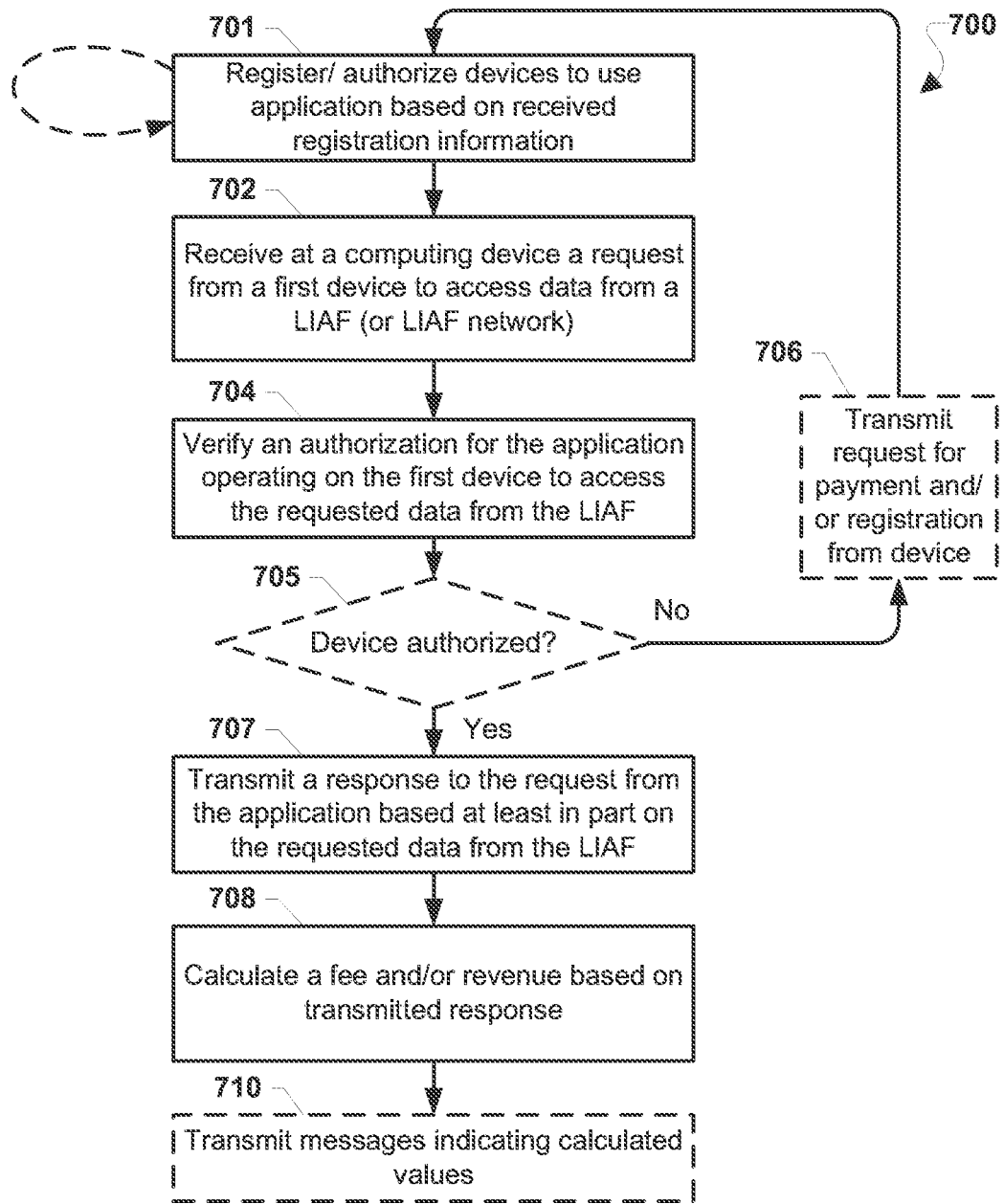
FIGS. 7A-7B are process flow diagrams illustrating embodiment methods for a computing device calculating fees/revenue in conjunction with a lighting infrastructure application framework.

FIG. 7A illustrates an embodiment method 700 for a computing device to perform operations for calculating fees/revenue in conjunction with an LIAF. In various embodiments, revenue generation and calculation may be automated by the computing device, which may be a service platform computer (e.g., server) that is part of a LIAF, a device associated with and maintained by a third-party applications provider (e.g., an applications provider server), or a combination of computing device associated with the LIAF.

In block 701, the computing device may register or authorize devices to use the application based on received registration information. For example, the computing device may create and store accounts for application providers that have transmitted sign-up data (or alternatively user devices that have downloaded an application). In an embodiment, registration information may include authentication credentials, access-control credentials, licensing information, advertisement authorization information (e.g., permission to participate in advertising, etc.), payment information, and/or a selection of one or more of a plurality of data types (e.g., a selection of a requested data type from plurality of data types that may be reported by lighting node platforms). In various embodiments, the selectable data types may include energy usage data, light status data, temperature data, humidity data, light detection data, camera data, motion detection data, audio data, person detection data, and vehicle detection data, correlated data, and aggregated data. In an embodiment, the operations in block 701 may be performed continually to enable the computing device to receive registration information from various devices at various times. In block 702, the computing device may receive a request from a first device to access data from a lighting infrastructure application framework (LIAF) or associated network. For example, the computing device (e.g., a service platform computer) may receive a request from a third-party device for open parking space data. In various embodiments, the first device may be a user device or alternatively a device associated with an application provider (e.g., a third-party server/device). However, in another embodiment, the first device may be a module, component, thread, subroutine, or other element of the computing device. In an embodiment, the request may be for data related to a particular lighting node platform of a plurality of lighting node platforms. For example, the request may be for ambient light sensor data related to a particular lighting node platform within a parking deck. In various embodiments, the request may be transmitted by or in associated with an application, such as a parking garage application executing on a mobile device, a third-party device (e.g., a third-party server), or a service platform computing device. For example, the request may be transmitted by an application controlled or executed by a subroutine executing on the computing device. In block 704, the computing device may verify an authorization for the application operating on the first device to access the requested data from the LIAF. Such an authorization may be based on a previous registration, a previous payment submitted to the computing device and related to the requesting device, and/or an advertising relationship established with the user of the first device. For example, the computing device may evaluate a pass code, account ID, or other identifying information within the request to determine whether the requesting device is registered, authorized, or otherwise eligible to receive the requested data. In optional determination block 705, the computing device may determine whether the device is authorized, and if no such authorization exists (e.g., no payment history or existing advertising relationship) (i.e., optional determination block 705="No"), in optional block 706 the computing device may transmit a request for payment and/or registration from the device, and may continue with the operations in block 701. Payment requests may be for direct payments from users or payments through the application or in other forms.

Once the service platform computer has verified that a user device is authorized to receive the requested information (i.e., optional determination block 705="Yes"), in block 707, the computing device may transmit a response to the request from the application based at least in part on the data from the LIAF (e.g., data from a first lighting node platform of the framework). This information may be stored in a database that is communicatively coupled to the computing device, may be retrieved in real time from lighting node platforms and/or gateway platform devices, and/or may be retrieved from a memory within the computing device.

In block 708, the computing device may calculate a fee and/or revenue based on the transmitted response. For example, based on the type of data transmitted in response to the request, the computing device may calculate an amount to charge the data recipient (e.g., application provider, user, etc.). The calculation in block 708 may also include calculating any revenue associated with the request. For example, the computing device may calculate the amount of credits, money, or other benefits that should be conferred to the lighting infrastructure owner associated with the data transmitted in response to the request (e.g., a percentage of any fee charged to a user, a reimbursement amount based on power usage, etc.). In an embodiment, calculated fees may be based on (or influenced by) other factors, such as the region/area where the lighting infrastructure (and thus lighting node platforms) is located, the periodicity of the data collection from the lighting infrastructure, subsidies that affect the LIAF in relation to the data, as well as any traded carbon credits. For example, the fee for transmitting a certain type of data to a third-party application provider (or an app executing on a user device) may be higher based on the popularity of the parking garage that includes the reporting lighting node platforms. In other words, the data may be priced dynamically. In optional block 710, the computing device may transmit messages indicating calculated values. For example, the computing device may transmit a billing message to an application provider or alternatively an income statement to a lighting infrastructure owner.

Figure 7B:
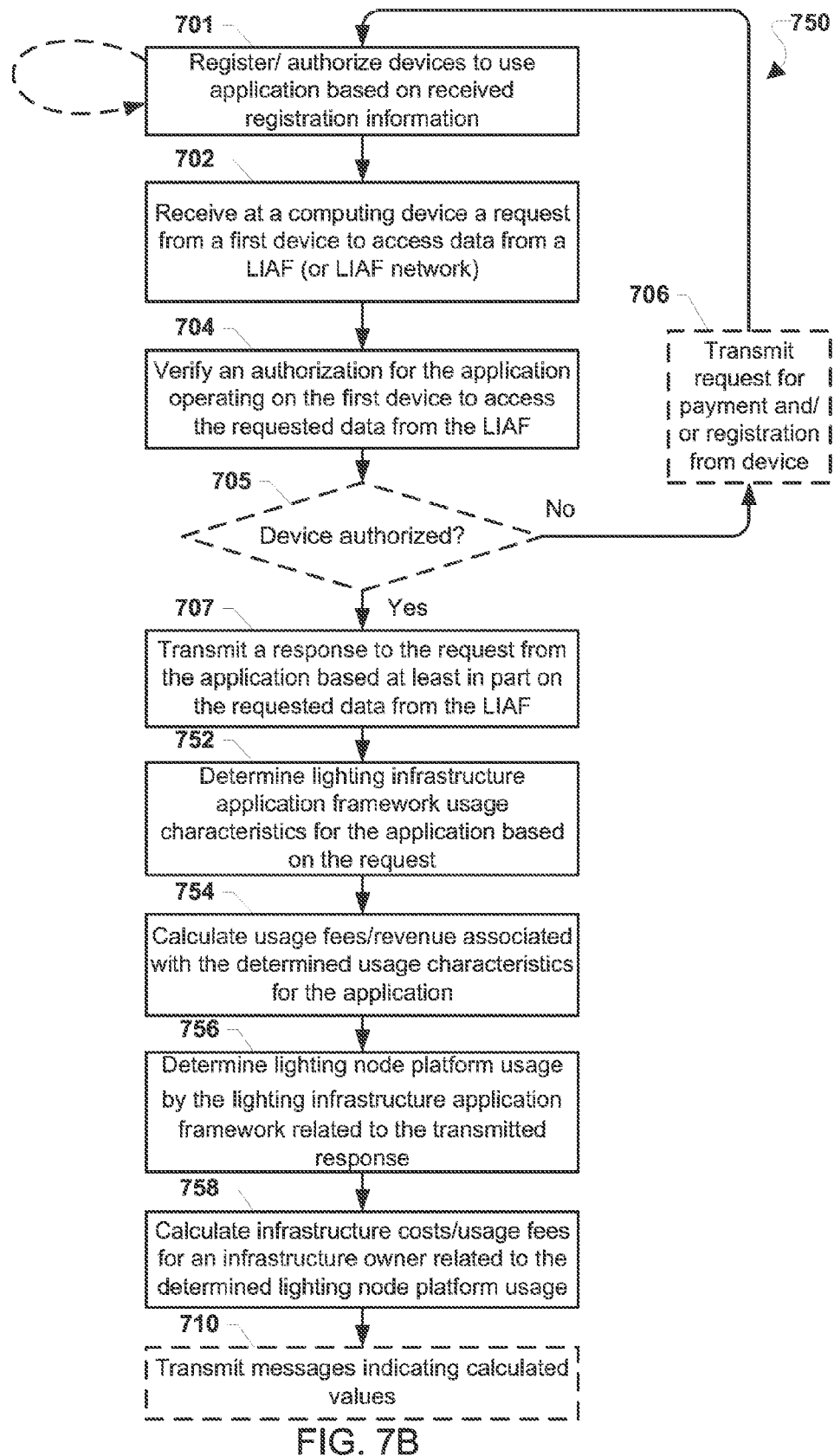

FIG. 7B illustrates an embodiment method 750 for a computing device to perform operations for calculating fees/revenue in conjunction with an LIAF. The method 750 is similar to the method 700, except the method 750 includes operations for calculating fees and costs for various entities based on accesses of data.

In block 701, the computing device may register or authorize devices to use the application based on received registration information. In block 702, the computing device may receive a request from a first device to access data from a lighting infrastructure application framework (LIAF) or associated network, such as an external device (e.g., third-party server, etc.) executing an application that requests data from a service platform computer. In block 704, the computing device may verify an authorization for the application operating on the first device to access the requested data from the LIAF. In optional determination block 705, the computing device may determine whether the device is authorized, and if no such authorization exists (e.g., no payment history or existing advertising relationship) (i.e., optional determination block 705="No"), in optional block 706 the computing device may transmit a request for payment and/or registration from the device, and may continue with the operations in block 701.

Once the service platform computer has verified that a user device is authorized to receive the requested information (or optional determination block 705="Yes"), in block 707, the computing device may transmit a response to the request from the application based at least in part on the data from the LIAF (e.g., data from a first lighting node platform of the framework).

In certain embodiments, the computing device may use a record of information requested and communicated to automatically determine revenue or fees from an application based on LIAF usage. Accordingly, in block 752 the computing device may determine lighting infrastructure application framework usage characteristics for the application based on the request, and in block 754 the computing device may automatically calculate usage fees/revenue associated with the determined usage characteristics for the application. In other words, compensation for application use may be calculated. Such a calculation may be done periodically or following application use of the system, with an automatic bill created and submitted to an application provider associated or alternatively directly to a user of the first device. In an embodiment, the fees/revenue calculation may be based at least in part on the data amount, type, frequency of delivery, data location, demand, request time, and data time frame, as well as any information stored in association with the requesting device (e.g., account details with contractual terms, promotions, etc.).

Similarly, in certain embodiments, the computing device may use a record of information requested and communicated to automatically determine revenue or fees due to a lighting infrastructure owner based on use of the platform and devices associated with a lighting infrastructure owner. Accordingly, in block 756 the computing device may determine lighting node platform usage by the lighting infrastructure application framework related to the transmitted response, and in block 758 the computing device may automatically calculate lighting infrastructure costs/usage fees for a lighting infrastructure owner related to the determined lighting node platform usage (or lighting node platform device usage), such as cost/fees for receiving lighting node platform data from lighting node platforms within the owner's lighting infrastructure. Just as with the application fees calculated in block 754, the calculation in block 758 may be done periodically or following application use of the system, with an automatic payment created and submitted to an application provider. In certain embodiments, a system may be structured to provide a minimum payment to a lighting infrastructure owner, with additional payments based on calculated usage provided above the minimum payment. In an embodiment, the computing device may also be configured to update a payment database or other account associated with the lighting infrastructure owner based on the calculation in block 758.

In optional block 710, the computing device may transmit messages indicating calculated values. The messages may include the various calculations of blocks 754 and/or block 758. For example, when the computing device is a service platform computing device within the LIAF, the computing device may transmit a revenue statement message to a lighting infrastructure owner device, a fee/bill message to an application provider computer and/or a user device. In another embodiment, the computing device may transmit messages to financial institution devices (e.g., banking servers, billing service device, etc.) communicating the various calculated fees/revenues.

Figure 8:
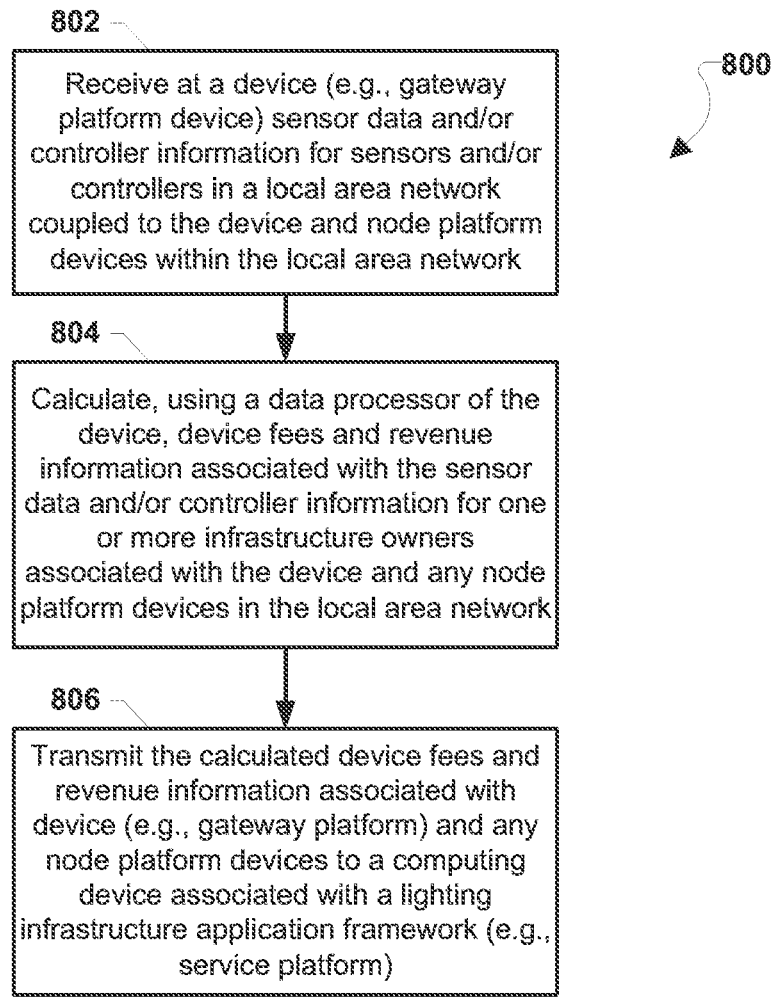
FIG. 8 is a process flow diagram illustrating an embodiment method for a gateway platform device to calculate fees and/or revenues associated with usage within a lighting infrastructure application framework.

FIG. 8 illustrates an embodiment method 800 for a gateway platform device to perform operations for calculating fees and/or revenues associated with usage within a lighting infrastructure application framework. In other words, a LIAF may be configured to support gateway platform devices with the functionality to perform data analysis and/or data processing. In an embodiment, the gateway platform device may be configured to perform method 800 to create and transmit aggregated, correlated, customized, or otherwise filter data from sensors within a LIAF (e.g., lighting node platform sensor data).

In block 802, a device (e.g., a gateway platform device) may receive sensor data and/or controller information for sensors and/or controllers in a local area network coupled to the device and lighting node platform devices within the local area network. In block 804, the device may calculate, using a data processor of the device, device fees and revenue information associated with the sensor data and/or controller information for one or more lighting infrastructure owners associated with the device and any lighting node platform devices in the local area network. In block 806, the device may transmit the calculated device fees and revenue information associated with the device and any lighting node platform devices to a computing device associated with a lighting infrastructure application framework. For example, a gateway platform device may transmit sensor data and/or revenue/fees information obtained from lighting node platforms to a service platform computer or server for storage, further processing, and/or distribution to applications. In another embodiment, the device may be any computing device within a lighting infrastructure, such as a site controller, lighting node platform devices, etc.

Figure 9A:
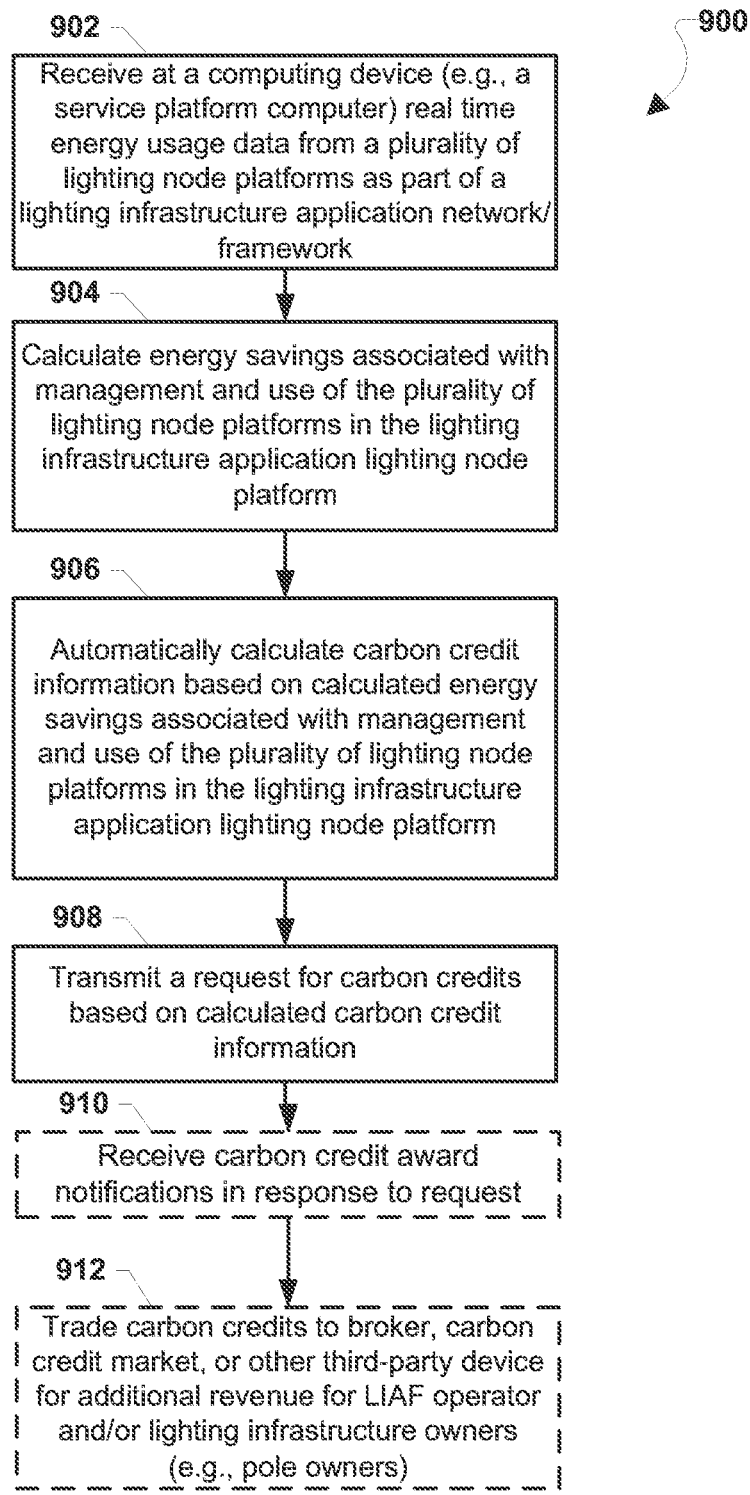
FIG. 9A is a process flow diagram illustrating an embodiment method for a computing device to calculate energy savings and carbon credit information associated with lighting node platforms.

FIG. 9A illustrates an embodiment method 900 for a computing device, such as a service platform computer, to calculate energy savings and carbon credit information associated with lighting node platforms. The United States Environment Protection Agency has established models for calculation of carbon emissions saved by reducing electric use, based on the number of Kilowatt-Hours of electricity saved. Therefore, if the electricity savings is known over time, the quantity of $CO_2$ emissions saved can be calculated and carbon credits may be calculated. In certain embodiments, aspects of a system may be particularly structured to comply with the requirements of a carbon offset policy/system. LIAF hardware and software may include a particularly tailored system with the ability to monitor actual energy usage for every single luminaire (or lighting node platform) connected to the network. This may be real-time information, provided on an effectively continuous basis. In particular, for each luminaire deployment within a LIAF, the amount of energy savings of each luminaire (such as saved via a LED light engine described above) compared to legacy technologies may be identified (e.g., the savings may be a known value) and carbon credits may be calculated based on the savings. For some luminaires, there may be no dimming so energy usage may be the same whenever the light is on. But for many others, dimming may be done based on time of day, occupancy, ambient light conditions, or other parameters. In these cases the actual energy usage will vary, often widely. In an embodiment, a service platform computer may monitor energy usage for luminaries in the network using a carbon credit module 512 as described above with reference to FIG. 5A.

The value of carbon credits (or the credits themselves) may then be allocated between entities (or stakeholders) associated with the LIAF, including the lighting infrastructure owners, the LIAF operator, and any associated application providers. In particular, a LIAF operator may calculate, monitor, and transfer carbon credits either to an exchange for sale or for direct sale according to whatever official models are in place in an area or carbon framework associated with the LIAF.

In block 902, the computing device may receive real time energy usage data from a plurality of lighting node platforms as part of a lighting infrastructure application network/framework. In block 904, the computing device may calculate energy savings associated with management and use of the plurality of lighting node platforms in the lighting infrastructure application framework. In block 906, the computing device may automatically calculate carbon credit information based on the calculated energy savings associated with management and use of the plurality of lighting node platforms in the lighting infrastructure application framework, and in block 908 may transmit a request for carbon credits based on the calculated carbon credit information. For example, the transmitted requested for carbon credits may be to a device associated with a third-party credit distribution service, a government agency, and/or any entity capable of providing carbon credits. Such requests may include proof of the calculated carbon credit information, such as energy saving reports, invoices, and/or other information that may substantiate energy savings or other eligibility. In optional block 910, the computing device may receive carbon credit award notifications in response to the request, and in optional block 912, the computing device may trade carbon credits to a broker, carbon credit market, or other third-party device for additional revenue for the LIAF operator and/or the lighting infrastructure owner (e.g., a light pole owner). For example, carbon credits that are awarded based on the request may be divided and shared between the operator of a service platform and the parking garage owner that installed lighting node platform devices contributing to the carbon credits. In an embodiment, the computing device may trade the carbon credits on an exchange or service that is associated with the LIAF. For example, the computing device (e.g., a service platform computer) may broadcast messages to partner devices indicating that the carbon credits are available for bidding. An example of such a bidding procedure is described below with reference to FIG. 9B.

In an embodiment, the computing device may determine the amount of additional revenue to share or distribute to various parties associated with the LIAF based on various schemes, and additionally may charge a service fee for requesting/trading carbon credits. The method 900 may thus provide an additional revenue model in association with a network or LIAF as described herein. In various embodiments, the operations in method 900 may be performed by a single device, or by various devices within a LIAF system. In various embodiments, the computing device may be a service platform computing device or a device within the lighting infrastructure (e.g., a gateway platform device).

Figure 9B:
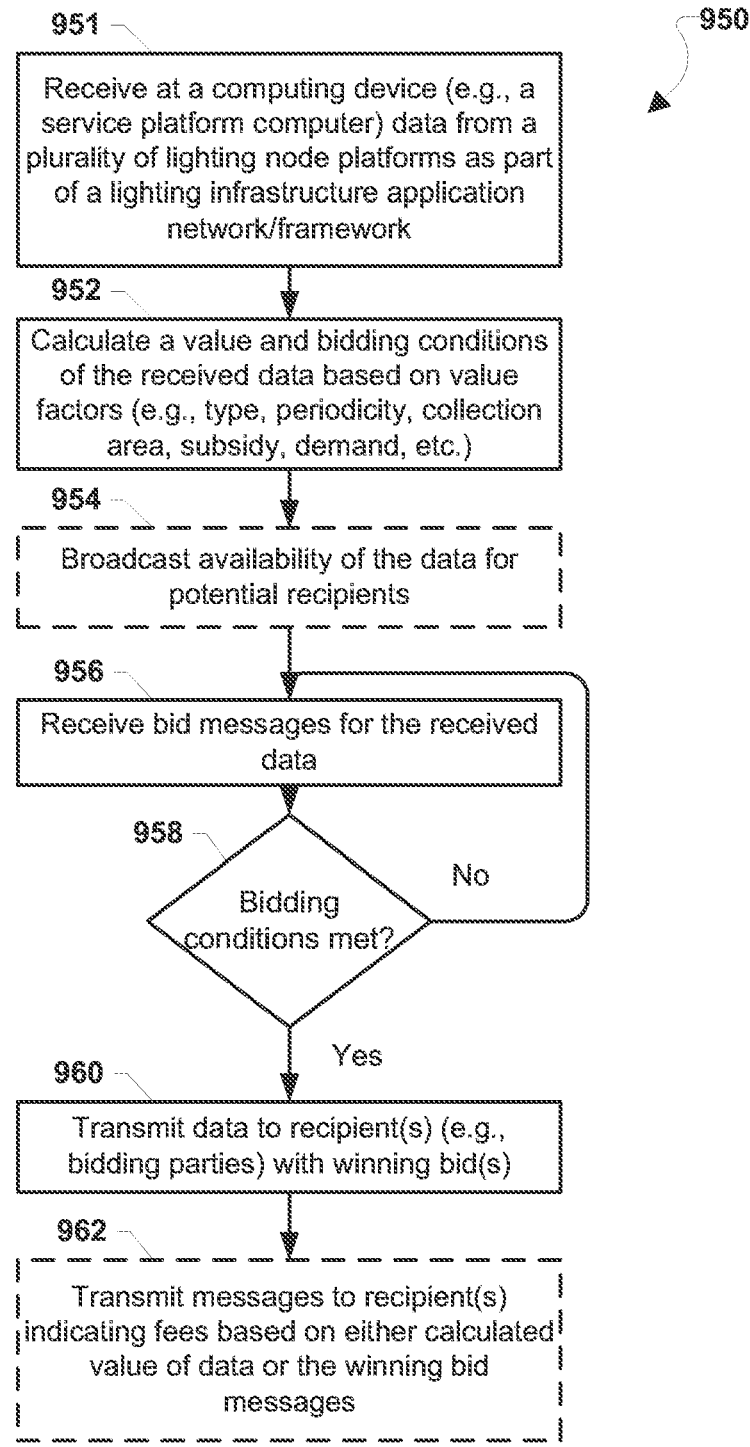
FIG. 9B is a process flow diagram illustrating an embodiment method for a computing device to provide a data market that utilizes bids for receiving LIAF data.

FIG. 9B illustrates an embodiment method 950 for a computing device providing a data market that utilizes bids for receiving LIAF data. In general, the computing device (e.g., a service platform computing device) may perform operations to make certain data from lighting node platforms exclusive, scarce, or otherwise dynamically priced. For example, data from a particular source, such as data from light poles in a dense urban area (e.g., a parking garage near Times Square in New York City), may be more important and thus valued at a higher price than data from another source, such as data from light poles in a less dense suburban or rural area (e.g., a parking garage in Long Island outside New York City). The method 950 may be performed to enable a market (or an exchange) where entities, such as application providers, can bid for certain data of the LIAF.

In block 951, the computing device may receive data from a plurality of lighting node platforms as part of a lighting infrastructure application network/framework, such as energy use data, various types of sensor data, etc. In block 952, the computing device may calculate a value and bidding conditions of the received data. As described above, calculating the value may be similar to the operations for calculating a fee/revenue. For example, the value may be based on the lighting infrastructure from which the data came (e.g., the power usage, utility rates, subsidies, etc.). However, the value may also be weighted, adjusted, or otherwise determined by other value factors, such as the type of data (e.g., motion sensor data, environmental data, aggregated/correlated data, etc.), the collection area from which the data comes (e.g., urban parking garage information vs. suburban parking garage information, etc.), how often the data is reported (e.g., every year, every day, etc.), the demand for the data (e.g., higher demand for a particular type of data or data source for a higher amount, etc.), etc. The bidding conditions may include a threshold bid amount over which the computing device may be permitted to award the data to a bidding party(ies). The bidding conditions may also include the number of bidding party(ies) that may receive the data and/or the time period for which parties may bid to receive the data. For example, the bidding conditions may be calculated based on the rarity of the received data type, the expense of collecting the data (e.g., video data may require high bandwidth or sensor energy use), and/or stored information that indicates the number/type of recipients as permitted by a lighting infrastructure owner.

In optional block 954, the computing device may broadcast the availability of the data for potential recipients, such as application providers known to have previously received/requested such data. The computing device may store a list of all entities, users, application providers, etc. that may have a need, prior use, or other interest in the received data. For example, the computing device may be configured to email all stored and relevant entities of the calculated value.

In block 956, the computing device may receive bid messages for the received data. The bid messages may indicate various monetary bids (e.g., a certain dollar/currency figure for a particular data set, etc.), or other valuable consideration (e.g., carbon credits for trade in exchange for data). For example, the computing device may receive signals via the Internet from application provider servers or other third-party devices that include bid amounts for receiving the data. In determination block 958, the computing device may determine whether the bidding conditions have been met. For example, the computing device may detect whether a lowest bid for the data has been received in a bid message, whether a certain maximum or minimum number of bidding parties have transmitted bid messages, whether a bidding time period has expired, etc. If the bidding conditions have not been met (i.e., determination block 958="No"), the computing device may continue with the operations in block 956.

If the bidding conditions have been met (i.e., determination block 958="Yes"), in block 960, the computing device may transmit the data to the recipient(s) (e.g., bidding parties) with the winning bid(s). For example, the computing device may transmit lighting node platform device sensor data to a server of an application provider that transmitted a bid message with the highest bid. In optional block 962, the computing device may transmit messages to the recipient(s) indicating fees based on either the calculated value of the data or the winning bid messages. For example, when parties are determined to receive the data based on a bidding condition of a certain number of winners, the message may indicate the recipient owes the calculated value. As another example, when the bidding conditions indicate that the highest bidder receives the data, the message may indicate that the recipient owes the bid amount the computing device received in that recipient's highest bid message.

In another embodiment, the computing device may also be configured to receive bid messages for carbon credits associated with the LIAF, thus also offering a market (or exchange) for carbon credits that have been accrued in relation to the LIAF (e.g., accrued by lighting pole owners). For example, the method 950 may be performed to transmit data and/or carbon credit information to bidding parties in exchange for bids that meet or exceed the calculated value of the carbon credits and/or data.

Figure 10A:
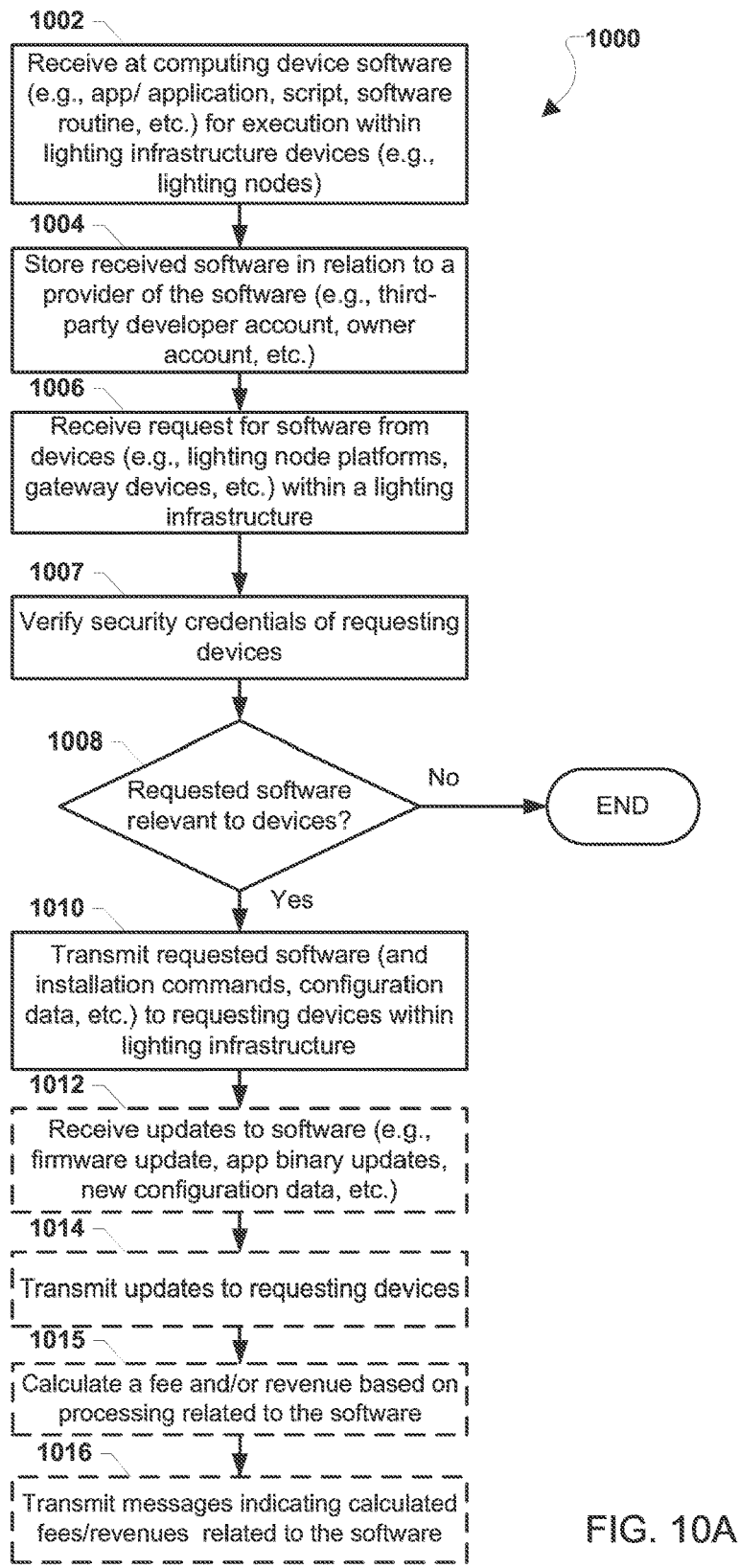
FIGS. 10A-B are process flow diagrams illustrating embodiment methods for a computing device to transmit software/firmware/scripts for use within a lighting infrastructure application framework.
Figure 10B:
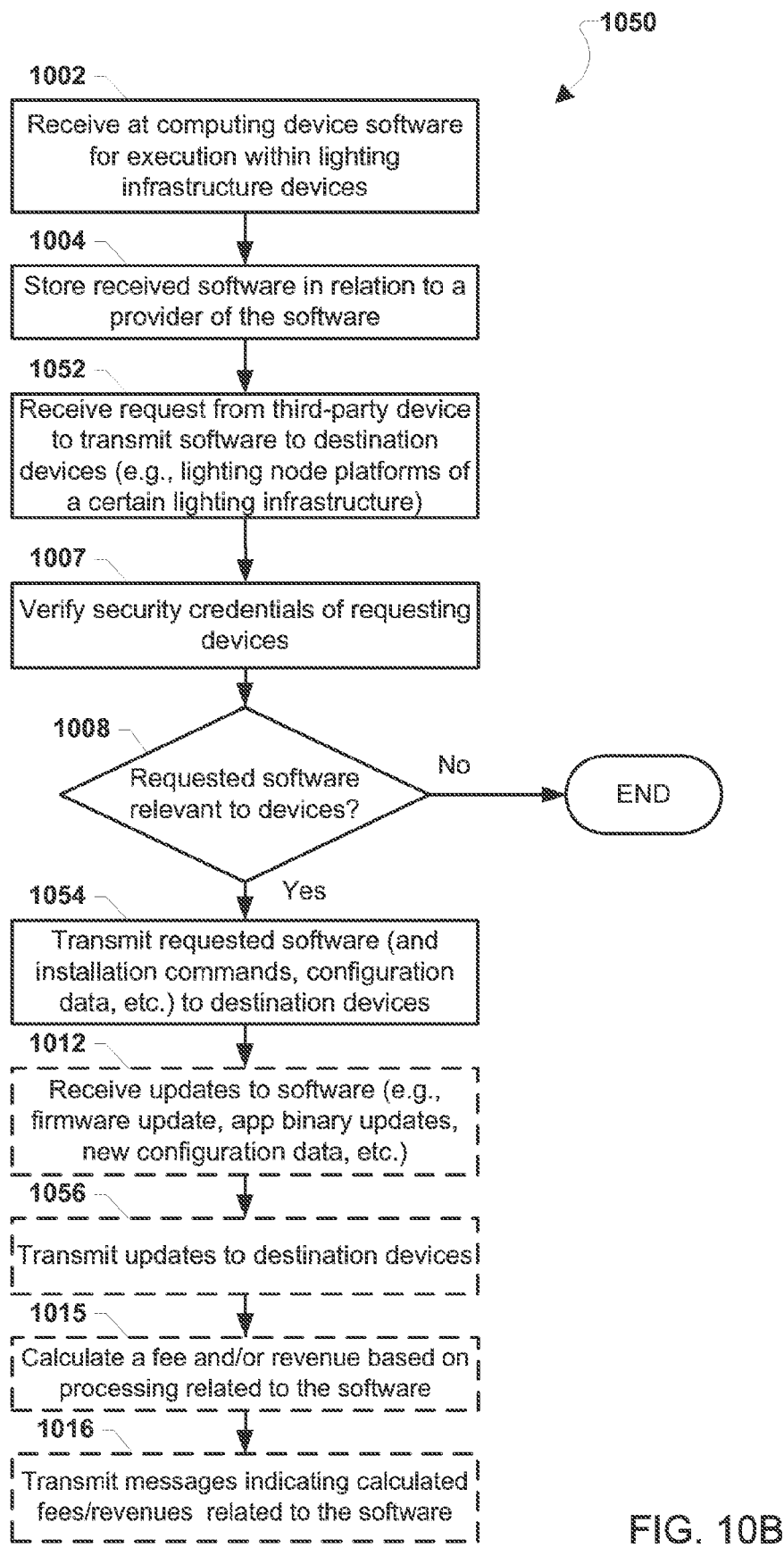

FIGS. 10A-10B illustrate embodiment methods for transmitting software, routines, scripts, instructions, and/or applications to various devices associated with a LIAF. As described above, the LIAF may utilize numerous types of software, such as system applications (or apps) developed by LIAF operators, owner applications (or apps) developed by lighting infrastructure owners, consumer applications, partner applications (or apps) for various use cases (e.g., security management, traffic reporting, parking management, etc.), customer applications, etc. Such software may be designed for execution on various devices, such as lighting node platforms, gateway platform devices, site controllers, personal computers, laptop computers, tablets, smartphones and/or mobile devices of users, etc. In various embodiments, the LIAF may utilize a computing device, such as a service platform computer(s), that is configured to store, manage, and distribute these various applications and software to devices in communication with the LIAF.

FIG. 10A illustrates an embodiment method 1000 for a computing device to transmit software (e.g., applications) in response to requests from devices within a LIAF. In block 1002, the computing device, such as a service platform computer, may receive software for execution within lighting infrastructure devices (e.g., for execution by lighting node platform devices). For example, such software may be an app or application developed by a lighting infrastructure owner or application provider. In various embodiments, the software may include scripts, routines, or other modules that are programmed to operate on processors and components known to be within lighting node platform devices, gateway platform devices, site controllers, or other computing devices associated with lighting infrastructures. In an embodiment, the software may further include applications, routines, or other instructions for execution by service platform computing devices, such as custom data processing software developed to generate data for application providers and/or other third-parties. In block 1004, the computing device may store the received software in relation to the provider of the software, such as by storing the software in a database with a link to an account for a lighting infrastructure owner, an application provider that developed the software, and/or a third-party developer of the software. In various embodiments, the computing device may determine whether the software is from a registered or authorized entity prior to storing or otherwise processing the software.

In block 1006, the computing device may receive a request for the software from devices within a lighting infrastructure. For example, request messages may be received from one or a plurality of lighting node platforms and/or gateway platform devices configured to periodically request new software from a service platform. In an embodiment, the requesting devices may be mobile device, such as mobile devices within a parking garage. For example, the computing device may transmit an app related to finding open parking spaces to a mobile device. In block 1007, the computing device may verify security credentials of the requesting devices. In an embodiment, the operations in block 1007 may be similar to the operations in blocks 704-706 described above. For example, the computing device may determine whether the requesting devices are known or authorized before executing any other actions to transmit software. In determination block 1008, the computing device may determine whether the requested software is relevant to devices requesting the software. In other words, the computing device may identify the nature, characteristics, intended use, hardware requirements, and freshness of the software in relation to the requesting devices. For example, the computing device may compare data indicating the software operating system specifications to stored specifications information related to the requesting device to determine whether the device may execute the software properly. If the requested software is not relevant (i.e., determination block 1008="No"), the computing device may do nothing and the method 1000 may end. In an embodiment, the relevancy determination may be based on authentication and access control credentials presented along with the request.

However, if the requested software is relevant (i.e., determination block 1008="Yes"), in block 1010 the computing device may transmit the requested software, as well as installation commands, configuration data and other information, to the requesting devices within the lighting infrastructure. For example, the computing device may transmit packets over the Internet that include a binary and commands for extracting the binary for installation in a lighting node platform. In optional block 1012, the computing device may receive updates to the software, such as firmware updates, app binary updates, new configuration data, new libraries, etc. In optional block 1014, the computing device may transmit the updates to the requesting devices. In an embodiment, the computing device may enable an "app store" service, where software, applications, apps, and other software may be requested and delivered to devices. In other embodiments, the computing device may perform operations to credit/debit financial accounts or otherwise accept compensation for storing, processing, and transmitting software to devices. For example, a billing component as described above may be utilized to bill (or alternatively reward) application providers for each software transmission.

In optional block 1015, the computing device may calculate a fee and/or revenue based on processing related to the software. In other words, the computing device may determine how much to charge parties for storing, processing, and distributing software for use in lighting infrastructures, as well as determine how much revenue to share with lighting infrastructure owners affected by the software. For example, the computing device may calculate a charge for a third-party application developer indicating a fee for each time the developer's software (or software update) was transmitted to lighting node platforms within a parking garage. Additionally, the calculated fees/revenues may include amounts associated with any data received in relation to transmitted software. In particular, the fee/revenues may be based on data transmitted in association with at least one of lighting node platform devices executing the software. For example, the computing device may calculate a fee for application providers for not only the storage and distribution of the providers' software, but also for any data that was received and processed in response to lighting node platform devices executing the software/script from an application provider. In optional block 1016, the computing device may transmit messages indicating calculated fees and/or revenues related to the software. For example, the computing device may transmit revenue statements to lighting infrastructure owner devices (e.g., management computers), users, a billing server, and/or devices associated with application developers.

In a non-limiting illustration: an application provider may provide the computing device with an application and/or script that configures lighting node platform devices within a parking lot to gather and transmit specific security information (e.g., motion, glass break, and traffic data) for use by the application provider. Accordingly, the computing device (e.g., service platform computer) may charge the application provider for each download of the application/script to lighting node platform devices as well as for each transmission or packet received that includes the specific security information. The computing device may also transmit messages that indicate a calculated revenue (or share) that is due to the owner of the parking lot based on the downloading of the applications/scripts as well as the eventual transmission of the specific security information.

FIG. 10B illustrates an embodiment method 1050 for a computing device to transmit software (e.g., applications) in response to requests from third-party devices. The method 1050 is similar to the method 1000 described above, except that the method 1050 may be performed to perform wide distributions of software provided by a developer. For example, an application provider (e.g., government agency) may request that a service platform computer transmit a routine, suite, or app to all lighting node platforms within a particular geographic region, and when executed, the app/script may cause the lighting node platforms to broadcast an audio message.

In block 1002, the computing device, such as a service platform computer, may receive software for execution within lighting infrastructure devices. In block 1004, the computing device may store the received software in relation to an application provider, such as by storing the software in a relational database with a link to an account for a lighting infrastructure owner/application provider that developed the software. In block 1052, the computing device may receive a request from a third-party device to transmit the software to destination devices. For example, the request may indicate a list of lighting node platforms within a certain lighting infrastructure that should receive the software. Such a third-party device may include a computer/server/device associated with an application provider (e.g., an app developer), such as an application developer who wants his new lighting node platform application to be distributed to lighting node platforms devices within a certain parking garage. In various embodiments, the third-party device may or may not be associated with a lighting infrastructure owner (e.g., the third-party device may not be directly affiliated with the lighting node platforms devices and/or the owner of the parking garage including those lighting node platforms). In block 1007, the computing device may verify security credentials of the requesting devices. For example, the computing device may determine whether the third-party device has the correct authorization to cause software to be transmitted/installed into lighting node platform devices (e.g., destination devices).

In determination block 1008, the computing device may determine whether the requested software is relevant to the destination devices. In an embodiment, the computing device may determine whether the third-party device has the authorization to trigger the transmission of the software to the destination devices. If the requested software is not relevant (i.e., determination block 1008="No"), the computing device may do nothing and the method 1000 may end. In an embodiment, the relevancy determination may be based on authentication and access control credentials presented along with the software.

However, if the requested software is relevant (i.e., determination block 1008="Yes"), in block 1054, the computing device may transmit the requested software, as well as installation commands, configuration data and other information, to the destination devices. For example, the computing device may transmit packets over the Internet that include a binary and commands for extracting the binary for installation in lighting node platforms of a certain parking garage. In optional block 1012, the computing device may receive updates to the software, such as firmware updates, app binary updates, new configuration data, new libraries, etc. In optional block 1056, the computing device may transmit the updates to the destination devices. In optional block 1015, the computing device may calculate a fee and/or revenue based on processing related to the software. In optional block 1016, the computing device may transmit messages indicating calculated fees and/or revenues related to the software.

Figure 11:
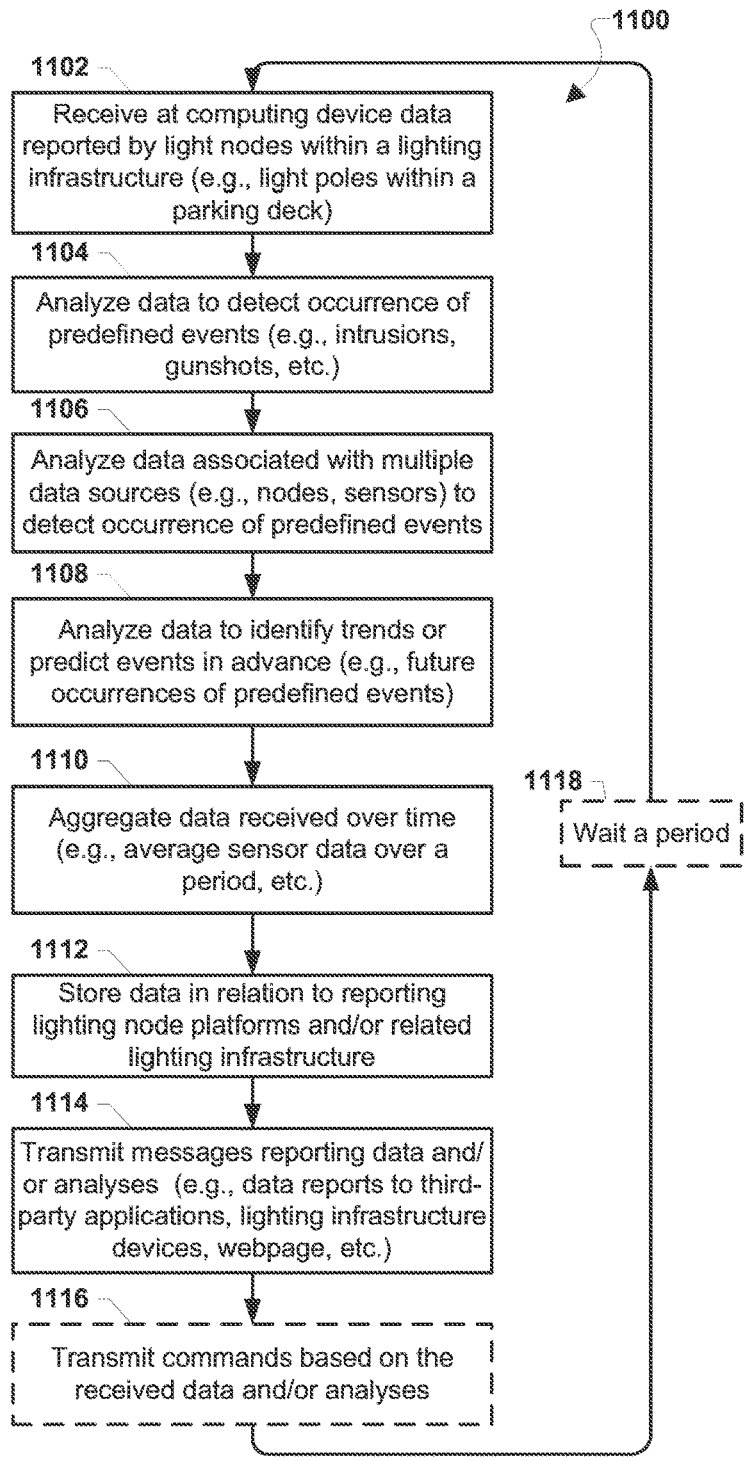
FIG. 11 is a process flow diagram illustrating an embodiment method for a computing device to process data received from lighting node platforms within a lighting infrastructure application framework.

FIG. 11 illustrates an embodiment method 1100 for a computing device to process data received from lighting node platforms within a LIAF. As described above, the LIAF may utilize data related to lighting infrastructures, such as parking garages, to provide to users, lighting infrastructure owners, application providers, etc. In various embodiments, the data may be used directly by parties, or alternatively, may be processed, analyzed, and otherwise processed. For example, data from numerous sensor arrays may be combined, evaluated, and interpreted by routines executing within a service platform, gateway platform, or other device in order to detect trends or predefined circumstances of interest. Accordingly, the method 1100 may be performed by the computing device in order to gather and share information related to data from lighting node platforms within the LIAF. In an embodiment, the computing device may be a service platform computer configured to utilize a data collection component as described above with reference to FIG. 5B. In various embodiments, the method 1100 may be performed by various devices or combinations of devices within the LIAF, such as gateway platform devices.

In block 1102, the computing device may receive data reported (or collected) by light node platforms within a lighting infrastructure, such as lighting node platforms on light poles within a parking deck or garage. In an embodiment, the data may be received via WAN or LAN communications.

The received data may include various data types/categories and content that may be utilized by user applications, lighting infrastructure owners, and other entities associated with the LIAF. For example, the received data may include raw sensor data collected from sensors within lighting node platforms and/or processed data from gateway platform devices. In particular, the data may include specific data that indicates energy usage (e.g., voltage and current) at a lighting node platform, on a per light engine basis for the entire light, on a per light engine channel, or on a per sensor basis. The data may also include specific data that indicates the status of a light, which may include an administrative status, such as temperature threshold or energy cost to trigger dimming, dimming percentage (e.g., bi-level dimming percentage), reporting of light status that includes settings of detection interval and reporting interval. Light status information may further include an operational status, such as present status of a light (e.g., on or off, dimmed, dimming amount/percentage, and presence of failed or abnormal LED channels, etc.). The data may also include specific data that indicates environmental data, (e.g., temperature, humidity and atmospheric pressure at the lighting node platform) and lighting data (e.g., ambient light, blue/red light color, etc.). The received data may include audio data, people detection data (e.g., single person, multiple people within an area, duration of sensor visibility, the number of people detected within an area, etc.), vehicle detection data (e.g., single vehicle or multiple vehicles detected, duration of sensor visibility, etc.), and/or vehicle details sensor data (e.g., count, type, make, model, number plate recognition, and color recognition).

The data may also include specific data that indicates gases detected by sensors within lighting node platforms, such as carbon dioxide, carbon monoxide, methane, natural gas, oxygen, propane, butane, ammonia, or hydrogen sulfide. Other types of data may include accelerometer status, intrusion detector status, Bluetooth MAC address, active, passive, and hybrid RFID tag data, ISO-18000-7, and DASH 7 data.

In various embodiments, the received data may also include data relevant to particular applications (or application specific sensor data). Application specific sensor data may include data collected by an intrusion sensor at the base of a light pole or light fixture which may be used to detect the unauthorized opening of a cover at the base of a light pole or an unauthorized opening of the light fixture. Application specific sensor data may include data collected by a vibration sensor within a lighting node platform that may be used to detect vibrations related to intrusions, earthquake, and/or pole damage. Application specific sensor data may include data collected by a motion sensor at a lighting node platform which may be used to detect motion, the direction of that motion, and the type of that motion. The received data may also include correlated, custom, and/or aggregated data, as described below.

The computing device may process the received data to detect various predefined occurrences, events, conditions, and other important information. Accordingly, in block 1104, the computing device may analyze the received data to detect the occurrence of predefined events, such as intrusions, gunshots, and entity detections. As described above, various data may be parsed, matched, converted, interpreted, analyzed, and otherwise processed to determine whether certain conditions have or have not been satisfied in a lighting infrastructure. For example, received data may be compared to stored data patterns or evaluated against threshold values to detect known events or conditions. In particular, based on received intrusion sensor data, the computing device may detect an unauthorized opening of a cover at the base of a light pole or an unauthorized opening of the light fixture. Based on an evaluation of received vibration sensor data, the computing device may detect intrusions, earthquakes, and/or pole damage. Based on an evaluation of received motion sensor data, the computing device may detect motion, the direction of that motion, and the type of that motion. Based on evaluated received audio sensor data, the computing device may detect glass breaking events, crowd formations, gunshot events, vehicle engine on/off events, vehicle tire noise events, vehicle door slam noise events, human communication events (e.g., yelling, talking, etc.), human distress noise events (e.g., pitch and volume of detected voice audio data, etc.), and multiple human communications event (e.g., different voices present, etc.). In an embodiment, the received data may be evaluated to detect the presence of people. For example, based on the received data, the computing device may detect a single person, multiple people, and the count of people near/in a lighting infrastructure. In another embodiment, the computing device may evaluate received data to detect vehicles, such as a single vehicle, multiple vehicles, and the duration of sensor visibility. Further, the received data may be used to detect a vehicle count, or information regarding make, model, color, etc.

In block 1106, the computing device may analyze data associated with multiple sources (e.g., data within the received data) to detect the occurrence of predefined events or conditions. In other words, the computing device may combine and process the received data from one source (e.g., one lighting node platform device) with data from other sources (e.g., other lighting nodes) to determine the existence of conditions (or correlated events) that may not be visible based on the data from a single data source. In various embodiments, the analysis of block 1106 may involve correlating sensor data received from multiple lighting node platforms (i.e., correlated data) and/or combining and analyzing data from multiple sensors within a single lighting node platform. For example, sensor data from a motion detector and a people detector within a lighting node platform of a lighting infrastructure may be analyzed to determine that a lighting function (or command) to turn on, off, dim or brighten lights should be activated or transmitted. As another example, motion sensor data and people count data may be analyzed to determine a count of people with motion detection to provide information about security, retail activity or traffic related events. As yet another example, motion detection data coupled with vehicle detection data can be analyzed to indicate a breach in security of a facility. Motion sensor data and audio data from multiple sensors may be correlated to detect glass breaking events, crowd formations, gunshot events, people talking, tire noises (e.g., squealing, speeding, etc.).

The time data collection is conducted may be combined with data from sensors such as discussed above, to detect motion detection during open and closed hours at a facility (e.g., activity in normal versus abnormal hours of a garage). Ambient light and motion detection may be correlated to detect the occurrence of a lighting control event. Motion data and video imagery from sensors may be analyzing to detect significant events like motion detection. Motion, audio and video imagery may be correlated, as well as motion, audio, vehicle detection and video imagery (or frames). In an embodiment, data received from various environmental sensors may be correlated (e.g., temperature and humidity, temperature and barometric pressure, etc.). In another embodiment, environmental sensor data and gas sensor data may be correlated to detect patterns (e.g., air conditions, etc.).

Analyzing multiple data sources (e.g., sensors), such as motion and vehicle count or motion and audio, may be useful to generate information for performing various actions or transmitting commands, as described below with reference to optional block 1116. For example, light level sensors coupled to motion detection sensors may provide information useful for lighting control, motion detection data may be combined with video to cause certain data to be captured only when an event occurs, thereby saving bandwidth and/or video data storage space, and current and historical sensor data (e.g., traffic flow patterns) can be correlated to set or adjust the transmission of control signals.

In block 1108, the computing device may analyze the data to identify trends and/or predict events in advance. In other words, the analysis of the received data may uncover predefined patterns that may be used to identify future events (or future occurrences of predefined events) that may be of interest or importance to the devices and/or entities associated with the LIAF. For example, the computing device may analyze the received data against historical sensor data to identify statistical information related to sensor data from a particular lighting node platform. In another example, based on a determined gunshot event detected from audio sensor data, the computing device may predict that emergency services may need to be called to a garage. Alternatively, based on a detected $CO_2$ emissions event under a lighting node platform, the computing device may predict a vehicle may be about to vacate a particular parking space. In an embodiment, the computing device may analyze stored received data to identify reoccurring conditions, such as times of day when garages are empty/full, patterns of glass breaking and/or audio of screams for "help!" (e.g., indications of an organized criminal operation). For example, based on analysis of historical audio sensor data from a certain lighting node platform within a parking garage, the computing device may identify that parked cars are regularly broken into at a certain time of day and day of week.

In block 1110, the computing device may aggregate data received over time, such as by averaging sensor data received from lighting node platforms in a lighting infrastructure. Aggregating may include using a variety of techniques, such as averaging, normalizing, and corrective processing, to generate a representative data set. Aggregating may be used to generate representative values for a group of lighting node platforms and/or lighting infrastructures. Aggregated data may be generated to represent information about particular groups of lighting node platforms sharing common characteristics, such as luminaire types at a site (e.g., post-top and wall-pack luminaires); environmentally protected vs. unprotected luminaires; or luminaires outside exposed areas; lighting node platforms in a light area (e.g., pathway, parking lot, driveway), lighting node platforms in a certain facility type (manufacturing, R&D), lighting node platforms in a certain corporate region (e.g., international vs. domestic), etc. In an embodiment, the computing device may aggregate power usage data to represent groupings by fixture type, facility, facility type, and/or geographical region. In another embodiment, environment sensing related aggregation may be provided for geographical areas or facility types. In another embodiment, the computing device may aggregate data based on user-specified criteria, such as time of day.

Various applications associated with the LIAF may utilize aggregated data. For example, security applications may utilize aggregations for geographical area or facility type, traffic applications may utilize aggregations by time-of-day, week, month, year or by geographical area (e.g., school area vs. retail area), and retail applications may utilize aggregations by time of day, week, month, etc., as well as by geographical area or facility type (e.g., mall vs. small shopping area.).

In block 1112, the computing device may store data, such as the received data and any analysis information generated from the operations in blocks 1104-1110, in relation to the reporting lighting node platforms and/or the related lighting infrastructure. For example, the computing device may store aggregated light sensor data in relation to a database record associated with a parking garage entity that includes the lighting node platforms reporting the aggregated light sensor data. As another example, the computing device may store in a database file linked to a particular lighting node platform all the audio, video, and motion sensor data reported in the received data.

In block 1114, the computing device may transmit messages reporting data and/or analyses, such as by transmitting data reports to third-party devices, lighting infrastructure devices, and webpages used by users. Such messages may be used by applications, such as applications transmitted by application providers to end users. For example, a message may include predicted predefined events, such as future break-ins.

In optional block 1116, the computing device may also transmit commands based on the received data and/or analyses. For example, the computing device may transmit commands, operating instructions, scripts, software, control instructions, configuration data, and other information to gateway platforms, lighting node platforms, site controllers, and other devices based on the operations of the method 1100. For example, the commands may include instructions for a lighting node platform (or sensors coupled to the lighting node platform) to dim its light based on an identified trend that no cars enter a parking deck during a certain period of time. In an embodiment, based on identified trends, aggregated data, correlated data or information, or other data evaluations, the computing device may be configured to transmit commands instructing devices to increase sensor sensitivity, deactivate components, and adjust operating parameters of lighting node platforms. In various embodiments, the computing device may transmit the commands based on applications, stored protocols, or other requests received from application providers, lighting infrastructure owners, and/or users. In optional block 1118, the computing device may wait a period before continuing with the operations in block 1102.

In an embodiment, custom application development may allow users (or application providers) to specify data to be collected and forwarded to the custom applications and services, actions to be performed based on the data at the lighting node platforms, the format of the data that may be forwarded to applications or application services, and management of historical data. Custom data may additionally be created using raw custom data from sensors, which may be filtered or identified based on user specified criteria. One potential example may be custom data filtered by time of day. This may enable analysis and filtering of data for presentation of specifically tailored data including aggregated data and correlated data.

Data that is received and processed by a LIAF may be used to provide a wide number of open application uses. As lighting node platforms may not only include various sensors for gathering data but also be placed within various scenarios, such as parking garages and facilities, the LIAF may access data that may be used by LIAF operators, lighting infrastructure owners, application providers, and eventually end users. FIGS. 12A-13 show diagrams of embodiment applications that utilize data associated with lighting node platforms within a LIAF.

FIG. 12A is a diagram 1200 illustrating an embodiment parking management application 1220. In such an application, lighting node platforms 104 installed in various parking areas 1202 may be networked together using a system such as described above, and in turn coupled to a site controller 1210. Using the technology described above, information about the lighting node platforms 104 may be reported to the site controller 1210. In particular, lighting node platforms 104 may be connected to a series of vehicle detection sensors 1203, 1204, 1205 positioned above various parking spaces in the parking area 1202 (e.g., a parking garage). In an alternative embodiment, the lighting node platforms 104 may contain image sensors that enable parked vehicle identification. The sensors 1203, 1204, 1205 may operate using any well-known technology that detects the presence or absence of a vehicle parked underneath them. In this implementation each sensor 1203, 1204, 1205 includes an LED displaying whether the space is open, occupied, or reserved (e.g., lit for open, black/unlit for occupied, etc.). For example, the grey sensor 1203 may indicate a reserved space, the white sensor 1204 may indicate an open space, and the black sensors 1205 may indicate occupied spaces. This may enable a driver in the parking area 1202 to locate open spaces, used spaces, and reserved spaces. It may also allow the garage owner to know when spaces are available without having to visually inspect the entire garage.

The sensors 1203, 1204, 1205 may be coupled using wired or wireless technology to the lighting node platform 104, such as described for the system above. The lighting node platforms 104 may communicate with the site controller 1210. As described above, the site controller 1210 may be a gateway platform device that includes a user interface. This site controller 1210 may enable local site users to view data from the lighting node platforms 104 (or any gateway platforms) directly without having to access data from the service platform 110. In an embodiment, the site controller 1210 may transmit the collected data over a local area network (LAN) 1212 which may be connected to other devices 1214, such as devices 1214 that are configured to perform building management services or "BMS." For example, the devices 1214 may be configured to execute third-party services/applications that manage heating, ventilation, air conditioning, etc. systems within commercial buildings. In an embodiment, the devices 1214 may receive reports, sensor data, and other event information from the site controller 1210. The data from the site controller 1210 may also be transmitted over a wide area network 112 (e.g., WAN or the Internet) for processing by a service platform 110 computing device, as described above with reference to FIG. 11.

The service platform 110 computing device may collect, organize, analyze, aggregate, and otherwise process the received data as described above. For example, the service platform computing device may predict trends in parking area 1202 over time based on historical vehicle detection data received from the site controller 1210.

The LIAF system (as well as the data processed by the service platform 110) may be accessed by one or more user devices 1216 using a parking management application 1220, such as via WAN connections with mobile devices executing the application 1220. In an embodiment, the application 1220 may be accessed based on software as a service (SaaS) model (e.g., revenue may be generated based on access to the application/relevant application data). Using such an application 1220, user devices 1216 may access the data of the LIAF to determine parking availability (e.g., over time, currently, trends, etc.) and potentially reserve spaces. In an embodiment, the user devices 1216 may transmit fees to an application provider or alternatively the service platform 110 or the owner of the parking area 1202 based on use of the application 1220.

Figure 12B:
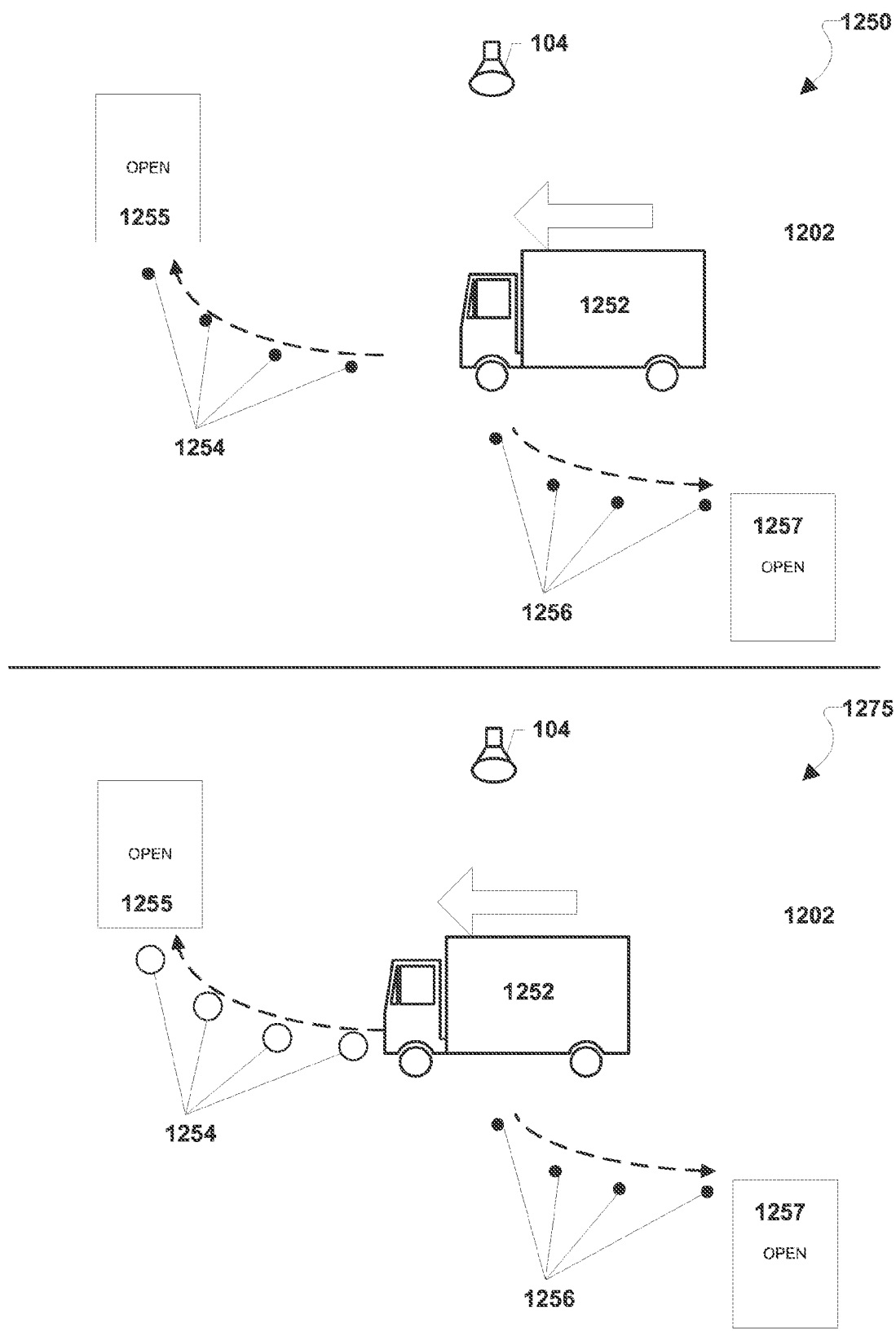

FIG. 12B illustrates another embodiment application for the LIAF that guides vehicles through a parking area, such as to available spaces and/or to exits. In particular, diagrams 1250 and 1275 show a vehicle 1252 within the parking area 1202 (e.g., a parking garage), a lighting node platform 104 that may be connected to or otherwise equipped with sensors for detecting at least motion and vehicles, a first array 1254 of LEDs (or LED sensors) connected to the lighting node platform 104, a first open parking space 1255, a second array 1256 of LEDs (or LED sensors) connected to the lighting node platform 104, and a second open parking space 1257. As described above, the LEDs of the arrays 1254, 1256 may be embedded within the floor, ceiling, and/or walls of the parking area (e.g., within the concrete/pavement of a parking structure) and also may be connected to the lighting node platform 104 via wired or wireless connections. In various embodiments, the LEDS of the arrays 1254, 1256 may be the lighting node platforms themselves (e.g., the light source within the lighting node platform devices may be configured to turn on or off or change colors/intensity, blink, etc.)

In diagram 1250, the arrays 1254, 1256 are not lit up (i.e., the LEDs are black). In other words, LEDs of the arrays 1254, 1256 may be in a neutral state. Based on vehicle detection sensor data and motion sensor data (and motion direction data) related to the vehicle 1252, the lighting node platform 104 may relay data to the site controller (not shown) and thus the service platform (not shown) indicating that the vehicle 1252 has been detected in a particular place going in a particular direction within the parking area. The service platform, or alternatively the site controller, may process that data to determine how that the detected vehicle 1252 is moving in a particular way (e.g., what direction). The service platform may correlate the detection of the vehicle and its direction of travel to data indicating the various open parking spaces 1255, 1257 within the parking area. Based on this information, the service platform may determine the closest, most convenient, or otherwise best open space for the vehicle to park. For example, if the vehicle 1252 is determined to have already passed the second open parking space 1257, the first open parking space may be a better destination as it would not require the vehicle 1252 to loop around or go in reverse.

Based on the processing of the received data from the lighting node platform 104, the service platform may transmit commands, instructions, or software to the site controller and thus to the lighting node platform 104 that indicates that the first array 1254 should be activated or lit up in order to guide the moving vehicle to the first open parking space 1255. This is shown in diagram 1275, where the LEDs of the first array 1254 are white (or lit). In various embodiments, the commands from the service platform (or site controller) may instruct the various LEDs to be lit in patterns, such as sequentially lighting subsequent LEDs in a path to guide the vehicle 1252.

FIG. 13 is a diagram 1300 illustrating an embodiment lighting maintenance application 1320. In such an application, lighting node platforms 104 installed in various parking areas 1202, 1302 may be networked together using a system such as described above, and in turn coupled to a site controller 1210. Using the technology described above, information about the lighting node platforms 104, such as power consumption, on-off activity, and sensor activity may be reported to the site controller 1210. In addition, the site controller 1210 may collect performance data (e.g., temperature of LEDs, temperature of drivers, forward current, etc.) and/or status data (e.g., light and sensor data status information). In an embodiment, the site controller 1210 may transmit the collected data over a local area network (LAN) 1212 which may be connected to other devices 1214 (e.g., BMS devices 1214).

The data from the site controller 1210 may also be transmitted over a wide area network 112 (e.g., the Internet) for processing by a service platform 110 computing device, as described above with reference to FIG. 11. For example, the service platform computing device may analyze data collected from lighting node platforms 104 to determine the occurrence of events, such as gunshots, trend information, such as high occupancy of parking spaces, and aggregated data (e.g., average vehicle motion for various time periods, etc.). In particular, the service platform 110 may be configured to process the received data to detect conditions that require proactive maintenance, such as malfunctioning or inefficient lights within the lighting infrastructure.

The LIAF system (as well as the data processed by the service platform 110) may be accessed by one or more maintenance companies 1304 using a lighting maintenance application 1320, to determine when service is required or when other attention is needed based on the processing of data by the service platform 110. Alternatively, the lighting maintenance application 1320 may simply transmit the raw data from the lighting node platforms 104 to the maintenance companies 1304 for processing with external systems or algorithms. The maintenance companies 1304 may pay a fee to access the application 1320 and the application (or the associated application provider) may pay a fee to access and support the sensor information via the LIAF. In such an embodiment, the lighting infrastructure owner (i.e., the owner of the parking areas 1202, 1302) may expect a lower maintenance fees and increased lighting infrastructure quality rather than a direct fee from the LIAF. In other words, instead of receive a portion of any revenues paid by the maintenance companies 1304 for use of the application 1320, the lighting infrastructure owner may benefit from better maintained facilities. In an embodiment, the application 1320 may be accessed based on a software as a service (SaaS) model.

In another embodiment, a LIAF may be used to implement a warehouse inventory application for the systems described above, with lighting node platforms including a series of RFID tag sensors positioned throughout a warehouse. These tag readers may detect RFID tags on various items in the warehouse. Using the network of lighting node platforms as described herein, the tag readers may provide information to a site controller and/or a service platform, thus enabling location data for items stored in the warehouse and monitoring of materials moving in and out of the warehouse. In an embodiment, the user devices may be configured to execute inventory software (or an inventory application) that communicates with the service platform to access item information. In an embodiment, the inventory software may enable users to access inventory information directly from site controllers, gateway platforms, and/or lighting node platforms to enable efficient local system use. In another embodiment, the LIAF may be used to monitor shipping terminals. In this case, sensors connected to lighting node platforms at shipping and destination terminals may collect data about containers moving in and out of the shipping and destination yards. That information may be transmitted via the lighting network (lighting node platforms, gateway platforms, etc.) at those locations to site controllers which then may transmit that information over the Internet to track containers from origin to destination.

While certain individual embodiments are described herein, including the specific implementations detailed just above, it will be understood that a broad variety of implementations may be made within a lighting infrastructure application framework, and that in various embodiments, functionality may be merged and performed by a single system. Therefore, a single embodiment may offer all of the functionality described herein including specific functionality, while in alternate embodiments, a variety or mixture limited functionality may be offered with limitations and mixtures of functionality limited by sensors devices, time, bandwidth, or any such system structure which may limit performance of specific embodiments as described herein.

Figure 14:
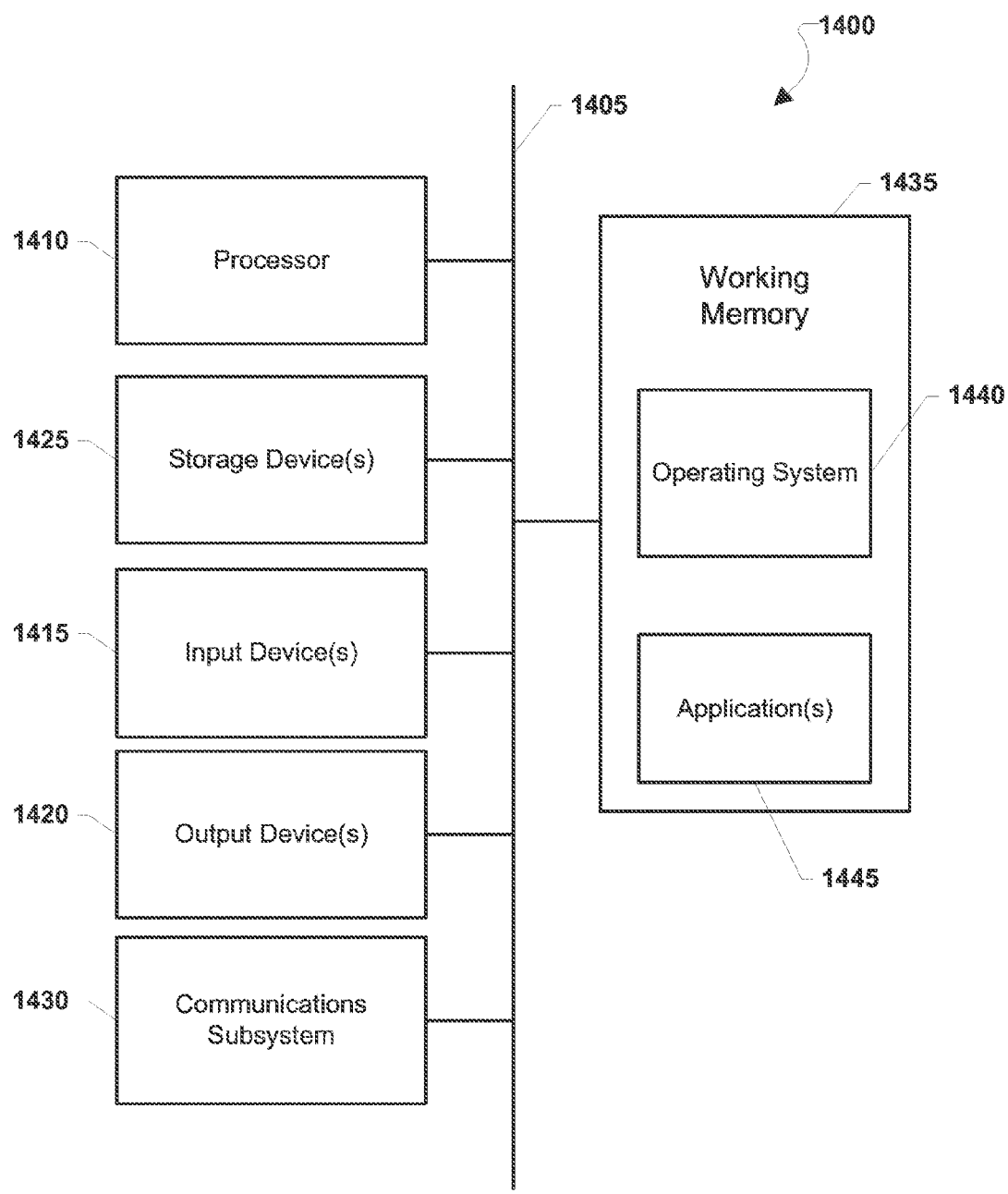
FIG. 14 is a component block diagram of a computing system suitable for use in various embodiments.

FIG. 14 illustrates a diagram of a computing system 1400 suitable for use in various embodiments. The computer system 1400 may be incorporated as part of the previously described computerized devices, such as any lighting node platform (or lighting node platform device), gateway platform (or gateway platform device), sensor, controller, user device, and/or service platform (or service platform computer) as described above. Similarly, any component, element, or module of a LIAF system according to various embodiments may include the computer system 1400, including various mobile devices or networked devices and servers. Further, the computing system 1400 may be configured to perform the various embodiment methods described above.

FIG. 14 is meant only to provide a generalized illustration of various components, any or all of which may be utilized as appropriate. FIG. 14, therefore, broadly illustrates how individual system elements may be implemented in a relatively separated or relatively more integrated manner.

The computer system 1400 may comprise hardware elements that may be electrically coupled via a bus 1405 (or may otherwise be in communication, as appropriate). The hardware elements may include one or more processors 1410, including without limitation one or more general-purpose processors and/or one or more special-purpose processors (such as digital signal processing chips, graphics acceleration processors, and/or the like); one or more input devices 1415, which may include without limitation a mouse, a keyboard and/or the like; and one or more output devices 1420, which may include without limitation a display device, a printer and/or the like.

The computer system 1400 may further include (and/or be in communication with) one or more non-transitory storage devices 1425, which may comprise, without limitation, local and/or network accessible storage, and/or may include, without limitation, a disk drive, a drive array, an optical storage device, a solid-state storage device such as a random access memory ("RAM") and/or a read-only memory ("ROM"), which may be programmable, flash-updateable and/or the like. Such storage devices may be configured to implement any appropriate data stores, including without limitation, various file systems, database structures, and/or the like.

The computer system 1400 might also include a communications subsystem 1430, which may include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or similar communication interfaces. The communications subsystem 1430 may permit data to be exchanged with a network (such as the network described below, to name one example), other computer systems, and/or any other devices described herein. In many embodiments, the computer system 1400 will further comprise a non-transitory working memory 1435, which may include a RAM or ROM device, as described above.

The computer system 1400 also may comprise software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the methods) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a computer-readable storage medium, such as the storage device(s) 1425 described above. In some cases, the storage medium might be incorporated within a computer system, such as computer system 1400. In other embodiments, the storage medium might be separate from a computer system (e.g., a removable medium, such as a compact disc), and/or provided in an installation package, such that the storage medium may be used to program, configure and/or adapt a general purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality may comprise a dedicated system (having specialized components) or may be part of a more generic system. For example, an activity selection subsystem configured to provide some or all of the features described herein relating to the selection of activities by sensors or controllers may comprise hardware and/or software that is specialized (e.g., an application-specific integrated circuit (ASIC), a software method, etc.) or generic (e.g., processor(s) 1410, application programs 1445, etc.) Further, connection to other computing devices such as network input/output devices may be employed.

Some embodiments may employ a computer system (such as the computer system 1400) to perform methods in accordance with the disclosure. For example, some or all of the procedures of the described methods may be performed by the computer system 1400 in response to processor 1410 executing one or more sequences of one or more instructions (which might be incorporated into the operating system 1440 and/or other code, such as an application program 1445) contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processor(s) 1410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1400, various computer-readable media might be involved in providing instructions/code to processor(s) 1410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1425. Volatile media include, without limitation, dynamic memory, such as the working memory 1435. Transmission media include, without limitation, coaxial cables, copper wire and fiber optics, including the wires that comprise the bus 1405, as well as the various components of the communications subsystem 1430 (and/or the media by which the communications subsystem 1430 provides communication with other devices). Hence, transmission media may also take the form of waves (including without limitation radio, acoustic and/or light waves, such as those generated during radio-wave and infrared data communications). Non-transitory storage media, on the other hand, may not take such forms, and in various embodiments, any storage medium that participates in providing data that causes a machine to operate in a specific fashion may be implemented using non-transitory storage media.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a Flash-EPROM, any other memory chip or cartridge, a carrier wave as described hereinafter, or any other medium from which a computer may read instructions and/or code.

Various forms of computer-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1400. These signals, which might be in the form of electromagnetic signals, acoustic signals, optical signals and/or the like, are all examples of carrier waves on which instructions may be encoded, in accordance with various embodiments.

The communications subsystem 1430 (and/or components thereof) generally will receive the signals, and the bus 1405 then might carry the signals (and/or the data, instructions, etc. carried by the signals) to the working memory 1435, from which the processor(s) 1405 retrieves and executes the instructions. The instructions received by the working memory 1435 may optionally be stored on a non-transitory storage device 1425 either before or after execution by the processor(s) 1410.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples. Further, words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted in a flow with process arrows. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a computer-readable medium. The operations of a method or algorithm disclosed herein may be embodied in a processor-executable software module that may be stored on a non-transitory processor-readable or computer-readable storage medium. Non-transitory processor-readable storage media may be any available media that may be accessed by a computer or processor. By way of example, and not limitation, non-transitory computer-readable and processor-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable and processor-readable media. Additionally, the operations of a method or algorithm may reside as one or any combination or set of codes and/or instructions on a tangible, non-transitory machine readable medium and/or computer-readable medium that may be incorporated into a computer program product.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein. The present invention is related to the commonly assigned U.S. Non-Provisional Application No. 61/699,968, filed Jun. 12, 2012, the entire contents of which are hereby incorporated by reference.

What is claimed is:

1. A computing device configured to calculate savings information related to a lighting infrastructure application framework, the computing device comprising:

a memory; and a processor coupled to the memory, wherein the processor is configured with processor-executable instructions to perform operations comprising:

receiving, at a computing device having the processor, a request from a first device to access data from a lighting infrastructure, the data including at least one of sensor data and controller information related to at least one of a sensor and a controller, wherein the sensor and the controller are within a local area network coupled to the computing device and are associated with at least one lighting node platform device;

transmitting a response to the request from the first device based at least in part on the requested data;

calculating savings information associated with the requested data, wherein the savings information is associated with the management and use of the plurality of lighting node platform devices; and transmitting the calculated savings information to the first device associated with the lighting infrastructure application framework.

2. The computing device of claim 1, wherein the operations further comprise:

receiving at the computing device data including real time energy usage data from a plurality of lighting node platform devices within the lighting infrastructure application framework; and automatically calculating energy savings information associated with the management and the use of the plurality of lighting node platform devices.

3. The computing device of claim 2, wherein the operations further comprise:

automatically calculating carbon credit information based on the calculated energy savings information associated with the management and the use of the plurality of lighting node platform devices; and transmitting a request for carbon credits based on the calculated carbon credit information.

4. The computing device of claim 1, wherein the operations further comprise:

registering devices based on received registration information that includes at least one of authentication credentials, access-control credentials, licensing information, advertisement authorization information, payment information, and a selection of at least one of a plurality of data types, wherein the registration information is transmitted by one of a device associated with an application provider and the first device.

5. The computing device of claim 1, wherein the operations further comprise verifying an authorization for the first device to access the requested data from the lighting infrastructure application framework by determining whether the first device is authorized based on the received registration information; and transmitting a request for registration information from the first device when the first device is determined to not be authorized, and wherein transmitting a response to the request from the first device based at least in part on the requested data from the lighting infrastructure application framework comprises transmitting the response to the request from the first device when the first device is determined to be authorized.

6. The computing device of claim 1, wherein the lighting infrastructure application framework includes at least one service platform computing device, at least one gateway platform device, and the plurality of lighting node platform devices, and wherein the at least one gateway platform device is configured to exchange communications with the at least one service platform computing device, and wherein the plurality of lighting node platform devices are configured to exchange communications with the at least one gateway platform device such that data associated with the plurality of lighting node platform devices is transmitted to the at least one service platform computing device via the at least one gateway platform device.

7. The computing device of claim 3, wherein the operations further comprise trading carbon credits received in response to a request for additional revenue for at least one of the lighting infrastructure application framework operator and a lighting infrastructure owner associated with the plurality of lighting node platform devices.

8. The computing device of claim 1, wherein at least one of the plurality of lighting node platform devices comprises:

a power supply for receiving electrical power;

a light socket coupled to the power supply;

a node application controller comprising a processor coupled to the power supply;

a network interface coupled to the processor, wherein the network interface is communicatively coupled to a service platform computer; and a sensor coupled to the processor for detecting a condition at the at least one lighting node platform device, and in response providing information about the condition to the processor.

9. The computing device of claim 8, wherein the power supply for electrical power includes a power input terminal for receiving AC electrical power, and wherein first lighting node platform device further comprises:

an AC/DC converter coupled to the power input terminal;

an LED driver coupled to the AC/DC converter; and a power interface coupled to the LED driver to provide power from the AC/DC converter to a first sensor.

10. A method for a computing device to calculate savings information related to a lighting infrastructure application framework, the method comprising, at least:

receiving, at a computing device having the processor, a request from a first device to access data from a lighting infrastructure, the data including at least one of sensor data and controller information related to at least one of a sensor and a controller, wherein the sensor and the controller are within a local area network coupled to the computing device and are associated with at least one lighting node platform device;

transmitting a response to the request from the first device based at least in part on the requested data;

calculating savings information associated with the requested data, wherein the savings information is associated with the management and use of the plurality of lighting node platform devices; and transmitting the calculated savings information to the first device associated with the lighting infrastructure application framework.

11. The method of claim 10 further comprises:

receiving at the computing device data including real time energy usage data from a plurality of lighting node platform devices within the lighting infrastructure application framework automatically calculating energy savings information associated with the management and the use of the plurality of lighting node platform devices.

12. The method of claim 11, wherein the method further comprises:
automatically calculating carbon credit information based on the calculated energy savings information associated with the management and the use of the plurality of lighting node platform devices; and
transmitting a request for carbon credits based on the calculated carbon credit information.

13. The method of claim 10, wherein the lighting infrastructure application framework includes a plurality of sensors such that each of the plurality of lighting node platform devices comprises at least one sensor of the plurality of sensors, and
wherein each sensor of the plurality of sensors provides sensor data to a service platform computer.

14. The method of claim 10, further comprising registering devices based on received registration information including at least one of authentication credentials, access-control credentials, licensing information, advertisement authorization information, payment information, and a selection of at least one of a plurality of data types, wherein the registration information is transmitted by one of a device associated with an application provider and the first device.

15. The method of claim 14, wherein the plurality of data types includes energy usage data, occupancy sensor data, light sensor data, environmental sensor data, security sensor data, audio data, visual data, gas detection sensor data, intrusion detector data, motion sensor data, vibration sensor data, vehicle detection sensor data, safety sensor data, biohazard sensor data, scanning sensor data, location sensor data, biometric sensor data, mechanical sensor data, signal detectors, and industry specific sensor data, correlated data, and aggregated data.

16. The method of claim 10, wherein the lighting infrastructure application framework includes at least one service platform computing device, at least one gateway platform device, and the plurality of lighting node platform devices, and
wherein the at least one gateway platform device is configured to exchange communications with the at least one service platform computing device, and
wherein the plurality of lighting node platform devices are configured to exchange communications with the at least one gateway platform device such that data associated with the plurality of lighting node platform devices is transmitted to the at least one service platform computing device via the at least one gateway platform device.

17. The method of claim 12, further comprising trading carbon credits received in response to a request for additional revenue for at least one of the lighting infrastructure application framework operator and a lighting infrastructure owner associated with the plurality of lighting node platform devices.

18. A non-transitory processor-readable storage medium having stored thereon processor-executable software instructions configured to cause a processor to perform operations for calculating savings information related to a lighting infrastructure application framework, the operations comprising, at least:
receiving, at a computing device having the processor, a request from a first device to access data from a lighting infrastructure, the data including at least one of sensor data and controller information related to at least one of a sensor and a controller, wherein the sensor and the controller are within a local area network coupled to the computing device and are associated with at least one lighting node platform device;
transmitting a response to the request from the first device based at least in part on the requested data;
calculating savings information associated with the requested data, wherein the savings information is associated with the management and use of the plurality of lighting node platform devices; and
transmitting the calculated savings information to the first device associated with the lighting infrastructure application framework.

19. The non-transitory processor-readable storage medium of claim 18, wherein the operations further comprise:
receiving at the computing device data including real time energy usage data from a plurality of lighting node platform devices within the lighting infrastructure application framework automatically calculating energy savings information associated with the management and the use of the plurality of lighting node platform devices.

20. The non-transitory processor-readable storage medium of claim 19, wherein the operations further comprise automatically calculating carbon credit information based on the calculated energy savings information associated with the management and the use of the plurality of lighting node platform devices; and
transmitting a request for carbon credits based on the calculated carbon credit information.

* * * * *